(12) United States Patent
Kim et al.

(10) Patent No.: US 9,998,437 B2
(45) Date of Patent: Jun. 12, 2018

(54) KEY EXCHANGE THROUGH A TRUSTED PROXY

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 114 days.

(21) Appl. No.: 15/015,887

(22) Filed: Feb. 4, 2016

(65) Prior Publication Data

US 2016/0226845 A1 Aug. 4, 2016

Related U.S. Application Data

(60) Provisional application No. 62/111,827, filed on Feb. 4, 2015.

(51) Int. Cl.
*H04L 9/08* (2006.01)
*H04L 29/06* (2006.01)
*H04L 12/28* (2006.01)
*H04L 9/32* (2006.01)
(Continued)

(52) U.S. Cl.
CPC ............ *H04L 63/062* (2013.01); *H04L 9/083* (2013.01); *H04L 9/3215* (2013.01); *H04L 12/2803* (2013.01); *H04L 12/2816* (2013.01); *H04L 12/2818* (2013.01); *H04L 63/06* (2013.01); *H04L 63/0876* (2013.01);
(Continued)

(58) Field of Classification Search
CPC ............ H04L 12/2803; H04L 12/2816; H04L 12/2818; H04L 2209/80; H04L 63/06; H04L 63/0876; H04L 63/108; H04L 9/083; H04L 9/3215; H04W 12/04; H04W 12/06
See application file for complete search history.

(56) References Cited

U.S. PATENT DOCUMENTS

2005/0289347 A1* 12/2005 Ovadia ................. H04L 9/0877
713/171
2006/0274899 A1* 12/2006 Zhu ........................ H04L 9/083
380/281

(Continued)

*Primary Examiner* — Theodore C Parsons
(74) *Attorney, Agent, or Firm* — Kilpatrick Townsend & Stockton LLP

(57) ABSTRACT

Techniques for exchanging security keys via a trusted proxy are provided. For example, a method may include receiving, at a computing device, a communication including a unique identifier for an access device connected to a network, wherein unique identifiers include an expiration time. The method may further include using the unique identifier to determine a security key for the access device. The method may also include receiving, at the computing device, a new communication, wherein the new communication includes the unique identifier. The method may further include validating the unique identifier for the access device, wherein validating includes determining whether the unique identifier has expired, and then using the validated identifier to retrieve the security key for the access device. The method may also include transmitting the security key, wherein when the security key is received, the security key facilitates generating a signature.

18 Claims, 16 Drawing Sheets

(51) Int. Cl.
*H04W 12/04* (2009.01)
*H04W 12/06* (2009.01)

(52) U.S. Cl.
CPC ........... *H04L 63/108* (2013.01); *H04W 12/04* (2013.01); *H04L 2209/80* (2013.01); *H04W 12/06* (2013.01)

(56) References Cited

U.S. PATENT DOCUMENTS

| | | | | |
|---|---|---|---|---|
| 2007/0101122 A1* | 5/2007 | Guo | ...................... | H04L 63/061 |
| | | | | 713/153 |
| 2014/0089671 A1* | 3/2014 | Logue | ................. | H04L 63/0884 |
| | | | | 713/182 |
| 2017/0006003 A1* | 1/2017 | Zakaria | ................. | H04L 63/061 |

* cited by examiner

KEY EXCHANGE THROUGH A TRUSTED PROXY

CROSS-REFERENCE TO RELATED APPLICATIONS

The present application claims the benefit of and priority to U.S. Provisional Application No. 62/111,827, filed Feb. 4, 2015, the entire contents of which are incorporated herein by reference for all purposes.

FIELD

The present disclosure relates to registration of devices being added to a network. Specifically, various techniques and systems are provided for distributing security keys for devices connected to a network.

BACKGROUND

Multiple client devices (e.g., network devices, access devices, or the like) that provide various functionalities may be present within a local area network. For example, network devices that provide various functionalities may be registered with the local area network, and a home automation network device may provide a user with the ability to remotely configure or control one or more appliances within the user's home. A user may be able to monitor and control network devices connected to the local area network using an access device connected to the network. Each client device within the local area network may require credentials to access the network. For example, a user located within the environment in which the local area network exists may only be able to monitor and control network devices connected to the local area network (e.g., using a mobile access device) by furnishing credentials. Also, for example, when the user is located remotely from the local area network, the user may be required to furnish credentials again in order to monitor and control network devices connected to the local area network.

BRIEF SUMMARY

Techniques are described for providing security keys to access devices using a trusted proxy. For example, a computing device may receive a communication including a unique identifier for an access device connected to a network, wherein unique identifiers include an expiration time. The method may further include using the unique identifier to determine a security key for the access device. The method may also include receiving, at the computing device, a new communication, wherein the new communication includes the unique identifier. The method may further include validating the unique identifier for the access device, wherein validating includes determining whether the unique identifier has expired, and then using the validated identifier to retrieve the security key for the access device. The method may also include transmitting the security key, wherein when the security key is received, the security key facilitates generating a signature.

According to at least one example, when the security key is received by an access device, the security key facilitates generating a signature for the access device.

In one example, transmitting the security key includes using a trusted proxy, such as a network device.

According to an example, the new communication includes an expiration time generated by the access device, and wherein the expiration time is used to validate the unique identifier. In an example, the network is a home automation network and the new communication is received while the access device is not connected to the home automation network.

In some embodiments, a system may be provided that includes one or more data processors. The system may further include a memory having instructions stored thereon, which when executed by the one or more data processors, cause the computing device to perform operations including: receiving a communication including a unique identifier for an access device connected to a network, wherein unique identifiers include an expiration time; using the unique identifier to determine a security key for the access device; receiving a new communication, wherein the new communication includes the unique identifier; validating the unique identifier for the access device, wherein validating includes determining whether the unique identifier has expired; using the validated identifier to retrieve the security key for the access device; and transmitting the security key, wherein when the security key is received, the security key facilitates generating a signature.

In other embodiments, a computer-program product may be provided. The computer-program product may be tangibly embodied in a non-transitory machine-readable storage medium. The machine-readable storage medium may include instructions configured to cause one or more data processors to: receive a communication including a unique identifier for an access device connected to a network, wherein unique identifiers include an expiration time; use the unique identifier to determine a security key for the access device; receive a new communication, wherein the new communication includes the unique identifier; validate the unique identifier for the access device, wherein validating includes determining whether the unique identifier has expired; use the validated identifier to retrieve the security key for the access device; and transmit the security key, wherein when the security key is received, the security key facilitates generating a signature.

In some embodiments, the method, system, and computer-program product described above may further include receiving the signature and using the signature to authenticate the access device.

In some embodiments, the method, system, and computer-program product described above may further include: receiving unique identifiers corresponding to one or more access devices; generate a plurality of security keys corresponding to one or more access devices; associating security keys with unique identifiers; and storing the security keys and the unique identifiers.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
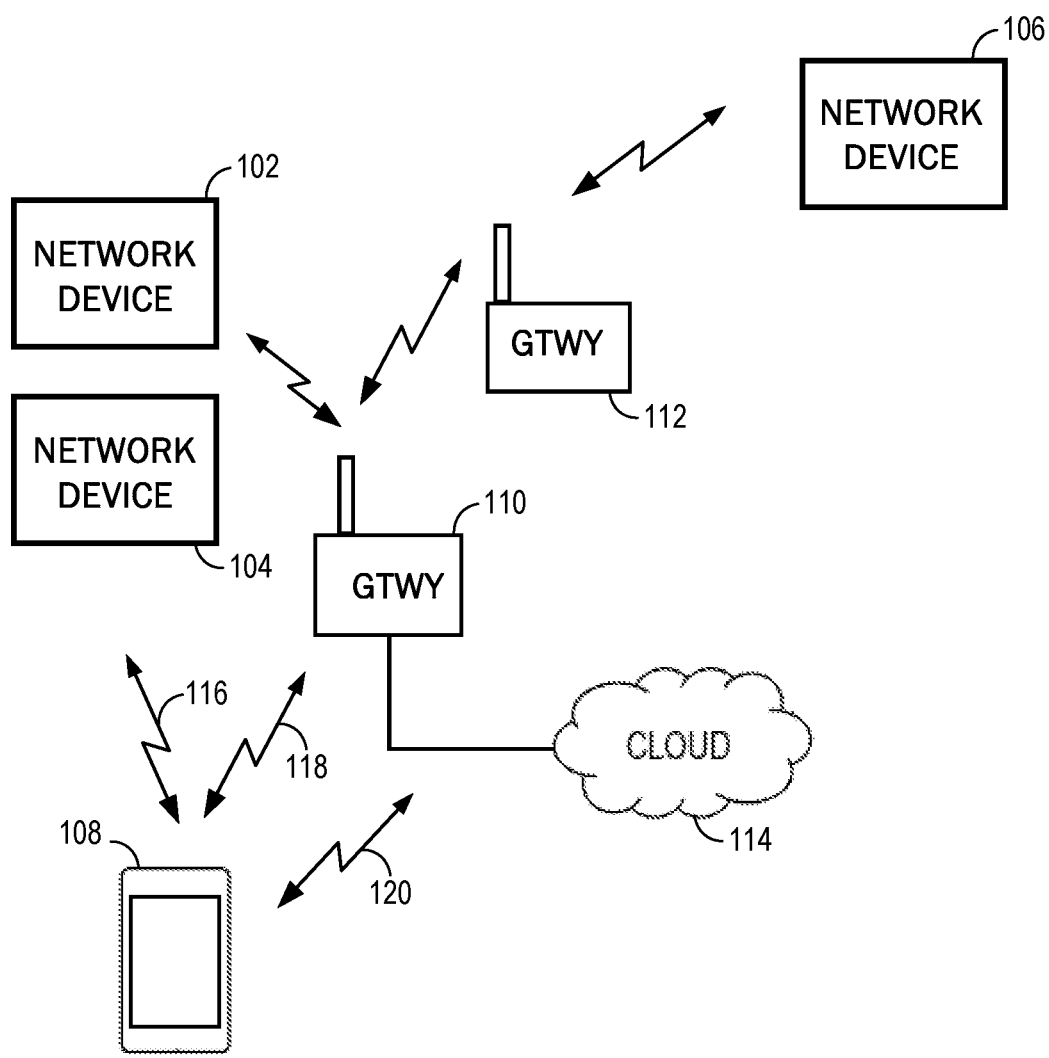
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that allow exchange of unique identifiers and security keys using a trusted proxy in a local area network, thus allowing an access device to be associated with the local area network. These techniques allow a user of the access device, whether located locally or remotely from the local area network, to access all network devices in the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi™ network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Accordingly, techniques and systems are described herein for exchanging security keys using a trusted proxy. Accordingly, respective, unique identifiers (IDs) may be generated for an access device and for a network device, and the IDs can be used to determine security keys for the access device and the network device. Whether located locally or remotely, a user of an access device may thus access all network devices in the local area network by using the access device's ID to obtain the security key for the access device.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a ZigBee® transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using ZigBee® signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., ZigBee®, Bluetooth™, WiFi™, IR, UWB, WiFi-Direct, BLE, cellular, Long-Term Evolution (LTE), WiMax™, or the like). A wired network may include any wired interface (e.g., fiber, Ethernet, powerline Ethernet, Ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
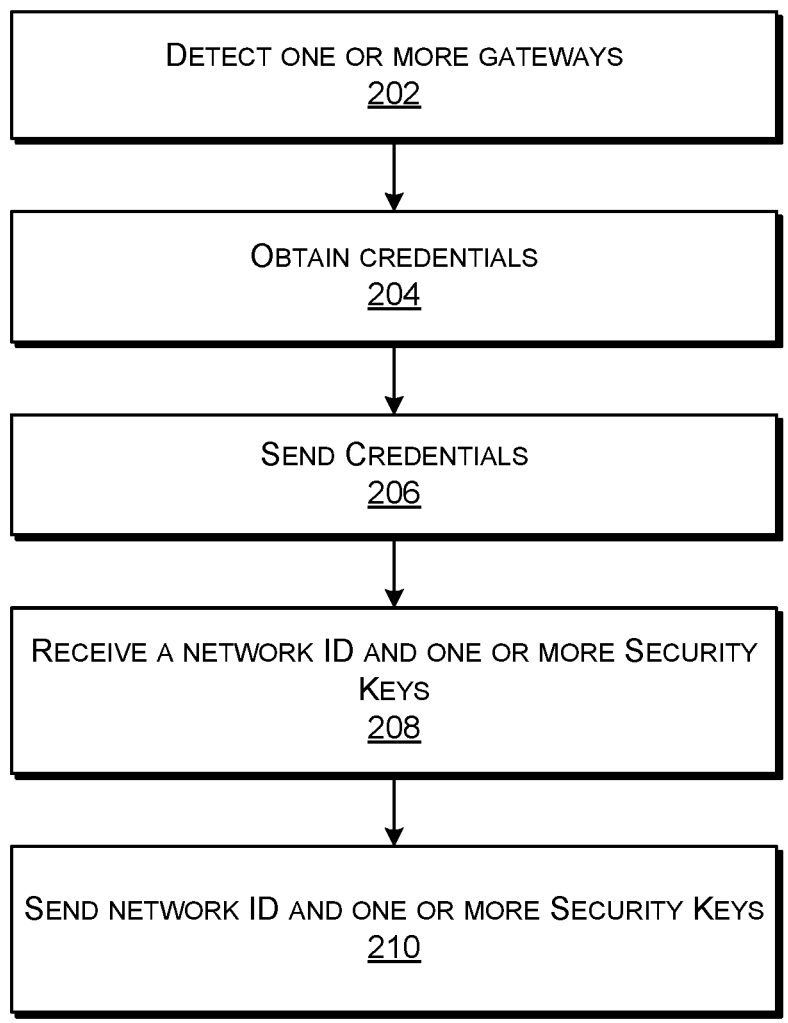
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, ZigBee®, Ultra-Wideband (UWB), WiFi-Direct, WiFi™, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 and 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table that indicates the current status of each network device (as of its last communication with each network device). A status table may include all statuses of each network device, or individual storage tables for each local area network or other subset of its network devices/networks. In one embodiment, a change in status may prompt the network device to push its change in status to the cloud network 114 for storage or updating of the cloud's stored status table. In another embodiment, cloud network 114 and/or gateway 110 may continuously (or periodically) communicate with each network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 114, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
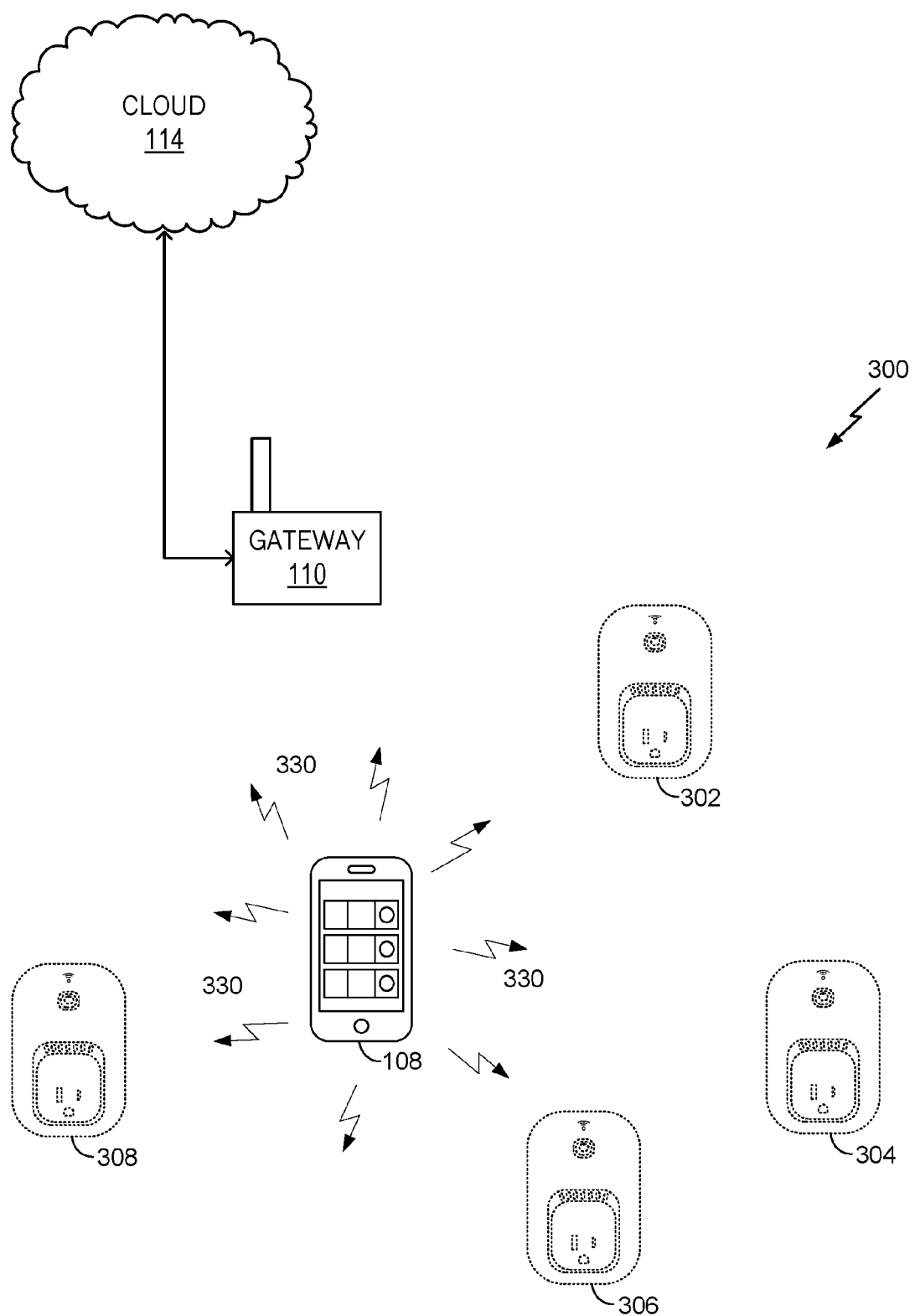
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, ZigBee®, Ultra-Wideband (UWB), WiFi-Direct, WiFi™, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
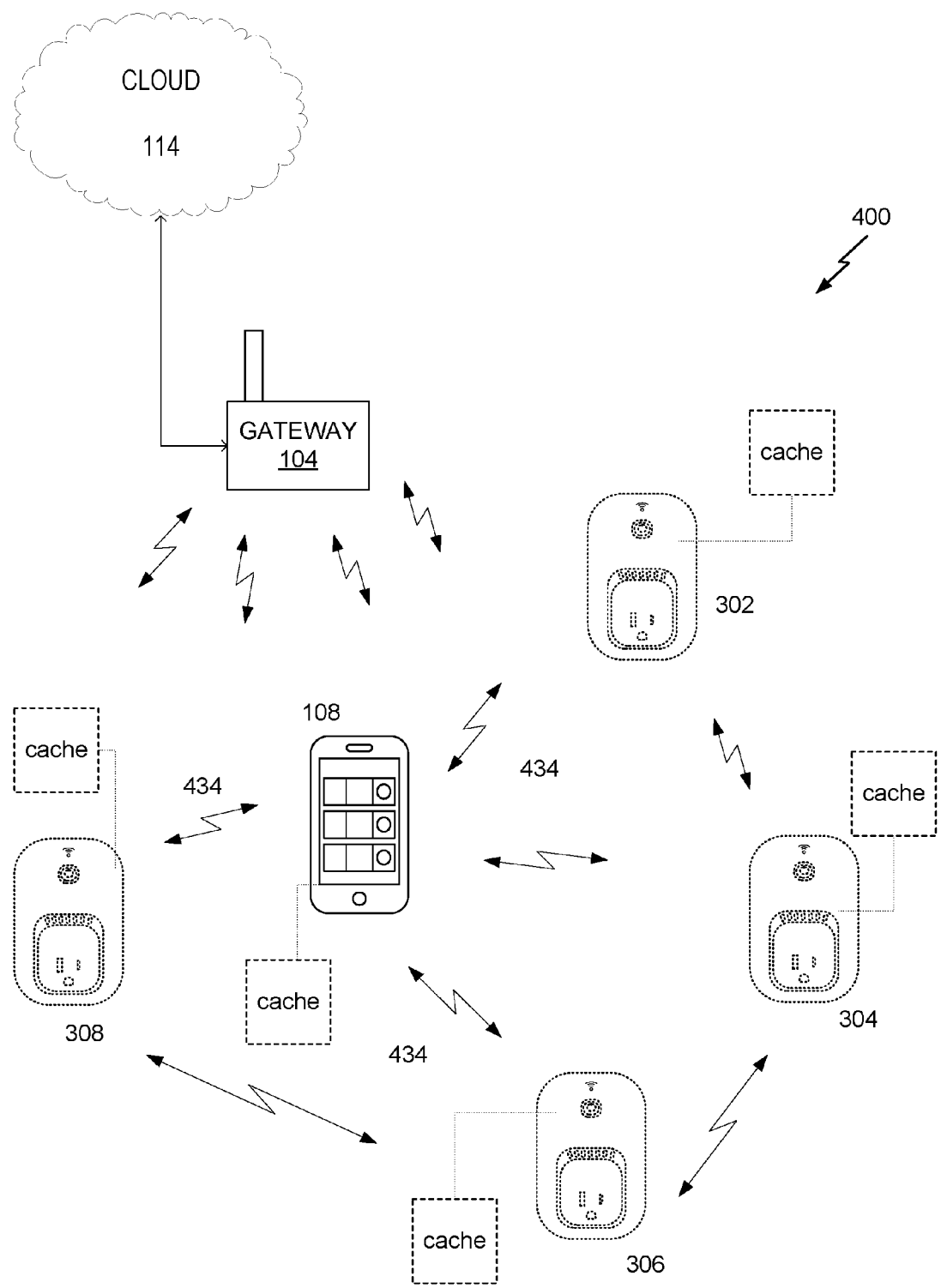
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a modular tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
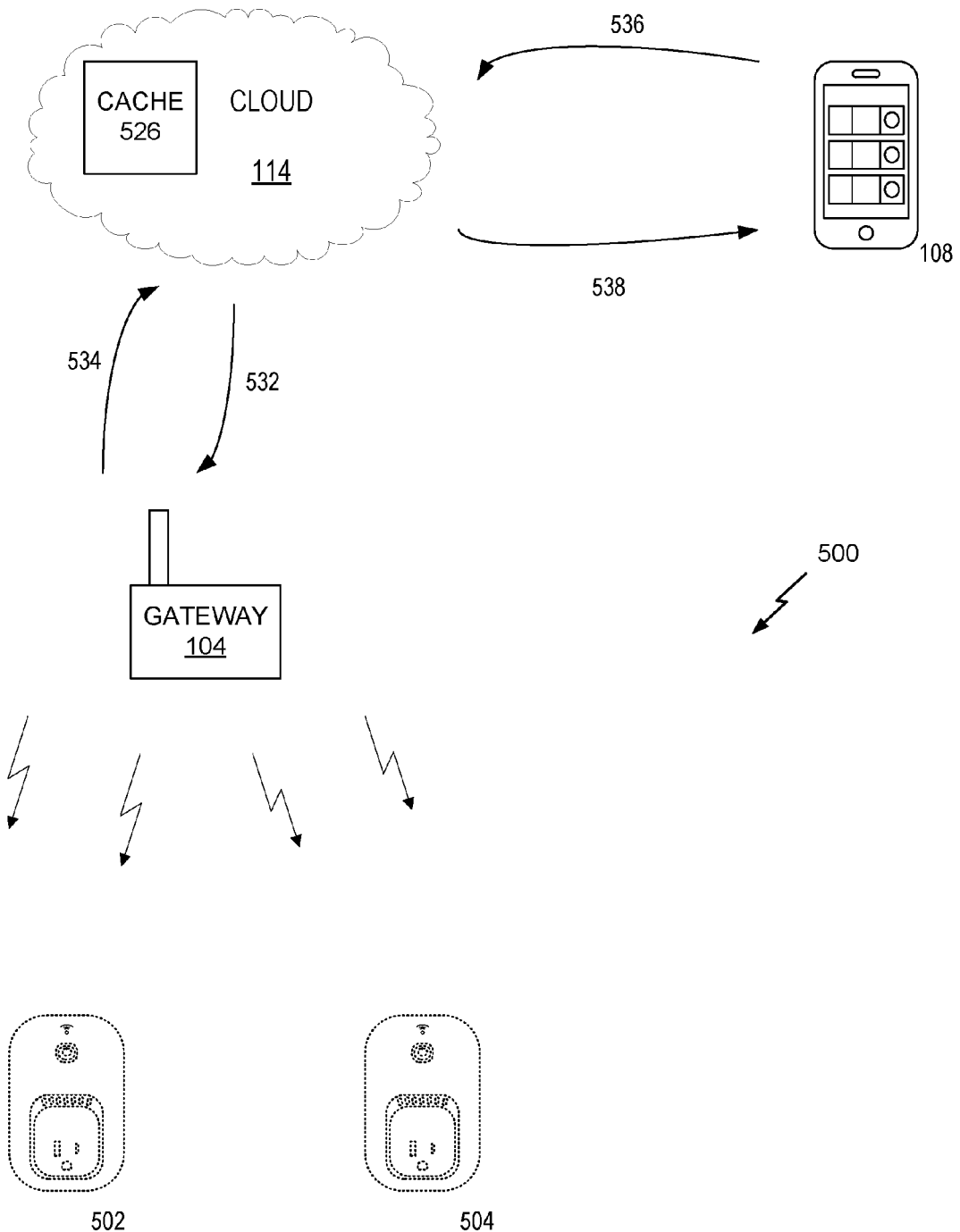
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/ send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
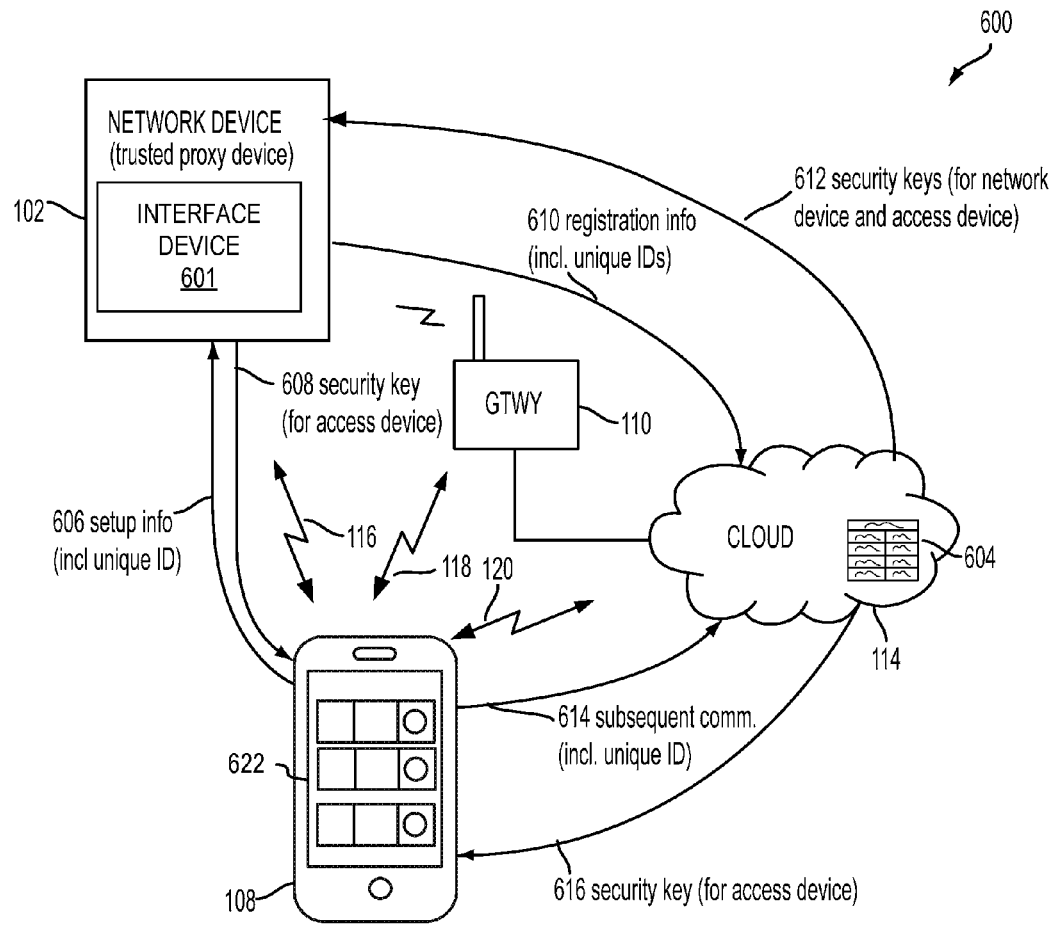
FIG. 6 is an illustration of data flows for providing keys for access devices and network devices within an example wireless network environment, in accordance with some embodiments.

FIG. 6 illustrates an embodiment of a process 600 for exchanging security keys using a trusted proxy. In the example of FIG. 6, the trusted proxy is network device 102. As shown, the process 600 may be performed by one or more computing devices, such as network device 102, a server associated with cloud network 114, and access device 108 described above with reference to FIGS. 1 and 3-5. In some embodiments, the network device 102 is associated with a home automation network, such as the local area network 100 described above with respect to FIGS. 1 and 3-5.

Process 600 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various home appliances located within the user's home, such as a television, radio, light, microwave, iron, space heater, sensor, and/or the like. For example, the user can monitor and control network devices by interacting with a visual interface of the gateway 110 (i.e., a web page for gateway 110) and/or a visual interface rendered on display 622 of the access device 108.

As shown, the process 600 can involve exchanging intra-network communications 606 and 608 between network device 102 and an access device 108. The process 600 can also generate unique identifiers (IDs) for network device 102 and for access device 108. For example, intra-network communication 608 can be sent from network device 102 to access device 108 in response to receiving setup information in communication 606 from access device 102. Communication 608 can include a security key for access device 108 that is generated at a cloud network 114 and transmitted to access device 108 via network device 102. In this example, network device 102 acts as a trusted proxy for exchanging information between access device 108 and cloud network 114. In some embodiments, communication 606 includes a unique identifier (ID) of the access device and setup information to be sent to network device 102. In an embodiment, access device 108 includes an application configured to generate the unique ID for access device and an associated expiration time for the unique ID. The unique ID may be randomly generated by the application such that no identifiable information from the access device 108 is included in the access device's ID. When the access device's unique ID and setup information are received by network device 102, network device 102 can include the ID in a communication 610 sent to cloud network 114. Communication 610 can include registration information for the access device 108 and the network device 102. For example, the registration information can include the unique ID for access device 108, a unique ID for network device 102, router information, and a request to register network device 102 and the access device 108 with cloud network 114.

Process 600 may include an initial setup of an application on access device 108. In one example, the unique ID for the access device may be generated by an application executing on access device 108. In the example of FIG. 6, network device 102 can connect to the cloud network 114 and send intra-network communication 610 to pass registration information including its own unique ID as well as the unique ID for access device 108. The application setup may coincide with the network device 102 being added to the local area network (e.g., a home automation network) for the first time. While access device 108 is connected to network device 102, the application may be launched. Once launched, the application may detect that it is in setup mode, and the application may help the network device 102 to pair with gateway 110 by accepting user input (e.g., at display 622 of access device 108) for the local area network credentials. In some embodiments, the credentials may include a SSID of the local area network and a password. The application may also generate a unique ID for access device 108. In an embodiment, the unique ID may include an expiration time, where the expiration time may indicate the period of time for which the ID is valid.

After generating a unique ID, an access device such as a mobile device may pass setup information, including its unique ID, to a network device. In the example of FIG. 6, access device 108 transmits intra-network communication 606 to network device 102. Communication 606 includes setup information for access device 108. The setup information includes a unique identifier (ID). After receiving communication 606, if the network device 102 can access the cloud network 114, it sends a communication 610 to the cloud network 114. Communication 610 may be a registration request for security keys for access device 108 and network device 102. That is, network device 102 initiates registration with cloud network 114 by sending communication 610 to cloud network 114 in order to obtain security keys, one for itself, one for the access device 108. As shown in FIG. 6, communication 610 can include a unique ID for network device 102 and the application-generated unique ID for access device 108.

After receiving communication 610, cloud network 114 may generate a unique security key for network device 102 and for access device 108. Cloud network 114 may use the unique IDs to generate security keys for network device 102 and for access device 108. The keys can be stored in data store 604 of cloud network 114. In the example of FIG. 6, data store 604 can include an ID-to-key mapping which can be used to subsequently retrieve a security key associated with a given unique ID. Security keys for network device 102 and access device 108 may distributed to network device 102 using communication 612. The respective security keys for network device 102 and access device 108 may be locally stored on each device.

Once the security keys for network device 102 and access device 108 are generated and stored, cloud network 114 may pass the keys back to network device 102 key using communication 612. In the example of FIG. 6, after determining the security keys for network device 102 and access device 108, cloud network 114 sends communication 612 to network device 102 in order to provide the security keys to the network device 102.

In one embodiment, a network device can store its security key locally. For example, a security key for network device 102 can be stored in a memory or cache of the network device, such as a cache accessible by interface device 601 of network device 102. Upon receiving communication 612 from cloud network 114 with the security keys (e.g., a key for the network device and another key for access device 108), the network device 102 can store its security key. In one embodiment, a security key can be stored in a memory or cache of a network device, such as a cache accessible by an interface device 601 of the network device 102. For example, the network device's security key may be stored by interface device 601. In an embodiment, the interface device 601 is implemented as a 'smart module' in hardware and firmware, such as, for example, a system on a chip (SOC) integrated into the network device 102.

The interface device 601 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 601 loses power, information stored in the flash memory may be retained. The DRAM of the interface device 601 may store various other types of information needed to run the interface device 601, such as all runtime instructions or code. The flash memory or DRAM or a combination thereof may include all instructions necessary to communicate with network device 102.

After receiving the security keys, network device 102 may attempt to send the access device's security key to access device 108 using communication 608. In this way, network device 102 can act as a trusted proxy to convey the access device's security key to access device 108. If access device 108 is still connected to local area network 100, communication 608 is sent, which completes distribution of the key for access device 108 from cloud network 114 through network device 102 (e.g., the trusted proxy). In environments where connectivity between network device 102 and access device 108 is unavailable, intermittent, or unreliable, an access device's security key may be temporarily stored at network device 102 so that it can be subsequently transmitted from network device 102 to access device 108. When the connectivity is restored, communication 608 may be sent to transmit the security key for access device 108 from network device 102 to access device 108.

In some embodiments, communications 606 and 608 may be exchanged when the network device 102 is rebooted (e.g., powered on, reset or restored to default settings, or the like). For example, when the network device 102 is rebooted, it may broadcast one or more messages on the local area network to discover whether there are any access devices in the local area network 100. For example, a communication may be broadcast from network device 102 to access device 108 using communication signal 116 according to a UPnP protocol during a discovery process. The network device 102 may then receive communications 606 from access device 108 indicating that it is located within the local area network. Communications 606 can be used to send network device 102 the access device's unique, application-generated ID. That is, after receiving a broadcast message from network device 102, access device 108 may initiate a setup process by sending communication 606 with setup information about the access device including the access device's unique ID.

In an embodiment, when access device 108 is no longer connected to local area network 100, but connected to cloud network 114, communications 614 and 616 can be exchanged between access device 108 and cloud network 114. Inter-network communications 614 and 616 can be used to provide the access device's security key when the access device is no longer connected to the local area network. For example, if the local area network 100 is a home network and the access device 108 is a mobile device, a user of the mobile access device may leave the home before the access device has received its security key. According to this embodiment, when access device 108 is no longer connected to local area network 100, communication 608 with the access device's security key cannot be sent from network device 102. In this embodiment, network device 102 will have both the unique, application-generated ID for access device 108, and the access device's security key received from cloud network 114. However, if the network device 102 cannot connect to the access device 108, then the access device will not be able to receive its security key from the network device. For example, communication 606 may have been sent while access device 108 was connected to local area network 100, and then the access device 108 may have been subsequently moved to a remote location that is outside of the range of signals provided by the gateway 110. Since the network device 102 is still on the local area network, it is able to send communication 610 with the access device's ID to cloud network 114 and register itself to the cloud network 114. As described above, upon receiving communication 610, the cloud network 114 is then able to generate security keys for both the network device 102 and for access device 108.

In an embodiment, when the application is subsequently launched on access device 108 while the access device is remote from the local area network, the application may detect that the access device 108 does not have its security key, but it may also detect that the access device's unique ID has already been generated. Based on these detections, the application determines that the access device 108 was previously in the process of setting up and trying to get a security key, but the access device 108 was taken away (i.e., removed from the local area network) before the key could be obtained. At this point, the access device may send communication 614 to the cloud network 114 with its application-generated unique ID. In one embodiment, before sending communication 614, the application on access device 108 checks to see if the generated ID is still valid. According to this embodiment, the expiration time of the ID is checked, and if the ID has not expired, communication 614 is sent. In this embodiment, access device 108 connects to the cloud automatically and sends communication 614 with the ID as part of a request for the access device's security key.

After receiving communication 614, cloud network 114 then checks to see if the ID is a known, existing ID. For example, if the network device 102 previously sent registration information and the access device's ID in communication 610, the cloud network 114 will trust access device 108 because that ID has already been passed to cloud network 114 by network device 102 (e.g., the trusted proxy). In this example, the cloud network 114 has already generated a key for the access device 108, and passes that key back to the access device in communication 616.

After the key distribution is complete, network device 102 and access device 108 may use their respective security keys to generate their own signatures in order to authenticate with the cloud network 114. For example, the keys stored on each device 102 and 108 may be subsequently used to generate respective signatures, which can be used by cloud network 114 for authentication of the devices. As described above, the keys may be sent from the cloud network 114 using communication 612 during registration of access device 108 and network device 102. In an embodiment, the keys are not exchanged as a part of subsequent authentication for those devices. For example, the signature for access device 108 can be sent to the cloud network 114 from access device 108 in subsequent communications (not shown) via communication signal 120. The cloud network 114 may then process the signature in order to authenticate access device 108. The network device and mobile device may use different techniques to generate a signature. The signatures generated by the devices may be compared with a cloud-generated signature at cloud network 114 as part of an authentication process.

As described above, the communications 606, 608, 610, and 612 may be used for an initial setup of access device 108 and to register both access device 108 and network device 102 with cloud network 114. This initial setup and registration can be carried out while access device 108 and network device 102 are both on the local area network 100. In additional or alternative embodiments, if access device 108 is disconnected from the local area network before receiving communication 608 with its key, the access device 108 can request its security key from cloud network 114. For example, an application on access device 108 may have generated the device's ID, that ID may have been sent to network device 102 in communication 606, and the ID may have then been sent to cloud network 114 via communication 612 through network device 102 (e.g., the proxy). However, if the access device 108 is taken off of the local area network at this point, setup cannot be completed. In this case, the access device 108 does not have its security key, and as a result, will not be able to access or control network device 102 until it obtains the key. An embodiment uses communications 614 and 616 to address this scenario. For example, when access device 108 is not on the local area network, the access device 108 can download its security key by exchanging communications 614 and 616 with cloud network 114. In an embodiment, communications 614 and 616 may be inter-network communications exchanged while access device 108 is not connected to network device 102 and local area network 100. For example, communications 614 and 616 can be used to obtain a security key when access device 108 is in a remote location that is outside of the range of signals provided by the gateway 110. That is, communications 614 and 616 can be used to retrieve a security key for access device 108 when connectivity to network device 102 is otherwise unavailable (e.g., when access device 108 cannot connect to the local area network, but can connect to cloud network 114 to obtain its security key using communication 616). In this way, when the access device 108 is remote from the local area network 100, it can exchange communications 614 and 616 with the cloud network 114 to receive its previously generated security key.

In some embodiments, when the access device is connected to the cloud network 114, the access device 108 sends communication 614 to the cloud network 114. In an embodiment, the communication 614 includes at least the unique ID for the access device 108. As discussed above, the unique ID can be generated by an application installed on access device 108 and can include an expiration time. After receiving communication 614, cloud network 114 may validate the access device's unique ID. For example, ID validation can include determining whether the unique ID has expired. If the unique ID has not expired, cloud network 114 may then retrieve the access device's security key. In an embodiment, the unique ID may be used retrieve a security key for access device 108. For example, cloud network 114 can look up the unique ID in an ID-to-key mapping 620 that is stored in data store 604 of cloud network 114. As shown in the example embodiment of FIG. 6, the ID-to-key mapping 620 can be implemented as a table that maps known, unique IDs to previously generated security keys. For example, records 624, 626, 628 in the ID-to-key mapping 620 table can be used to store unique device IDs and security keys for known devices such as access device 108 and network device 102.

In cases where cloud network 114 already has a security key for access device 108 and the unique, generated ID has not expired, communication 616 can be sent with the security key. Upon receiving communication 614, the cloud network 114 can compare the unique ID of the access device 108 to known device IDs stored in data store 604 in order to determine that there is a match between the unique ID sent with communication 614 and an existing ID (e.g., an ID stored in data store 604). After the ID is validated, it can be used to retrieve a security key at cloud network 114, and the key can be sent to access device 108 from cloud network 114 using communication 616. For example, if the cloud network 114 finds a security key for access device 108 in its data store 604, it may transmit the security key to the access device 108 using communication 616. After the security key is downloaded to access device 108 from cloud network 114 using communications 616, the security key can be used to generate an authentication signature for the access device 108.

In embodiments, cloud network 114 can receive unique IDs corresponding to multiple devices (e.g., network devices and access devices) and use the unique IDs to determine security keys. For example, cloud network 114 can generate keys that correspond to multiple network devices 102, 302, 502, 504. As shown in FIG. 6, cloud network 114 can store security keys and unique IDs in data store 604. Each security key can correspond to a respective one of the network devices 102, 302, 502, 504. A plurality of unique IDs and their corresponding security keys can be stored in data store 604 for later retrieval. For example, each security key in data store 604 can be associated with a unique device ID. Records 624, 626, 628 in the ID-to-key mapping 620 of data store 604 store unique device IDs and security keys for known devices such as previously registered access devices and network devices. The cloud network 114 uses the records in data store 604 to retrieve security keys.

In an embodiment, data store 604 is a database configured to store security keys for a plurality of network devices, with each of the stored security keys being mapped to a unique ID for a network device. For instance, network device 102 having a unique ID may be matched with an existing security key having been previously generated and stored as part of a registration process for the network device. Key retrieval can include comparing a unique ID received from a network device with an ID stored in data store 604. In cases where an existing security key for a network device is not found in data store 604, cloud network 114 can use registration information provided by a network device to generate a new security key, where the information is provided via communication 606 as part of a registration process for network device 102.

Figure 7:
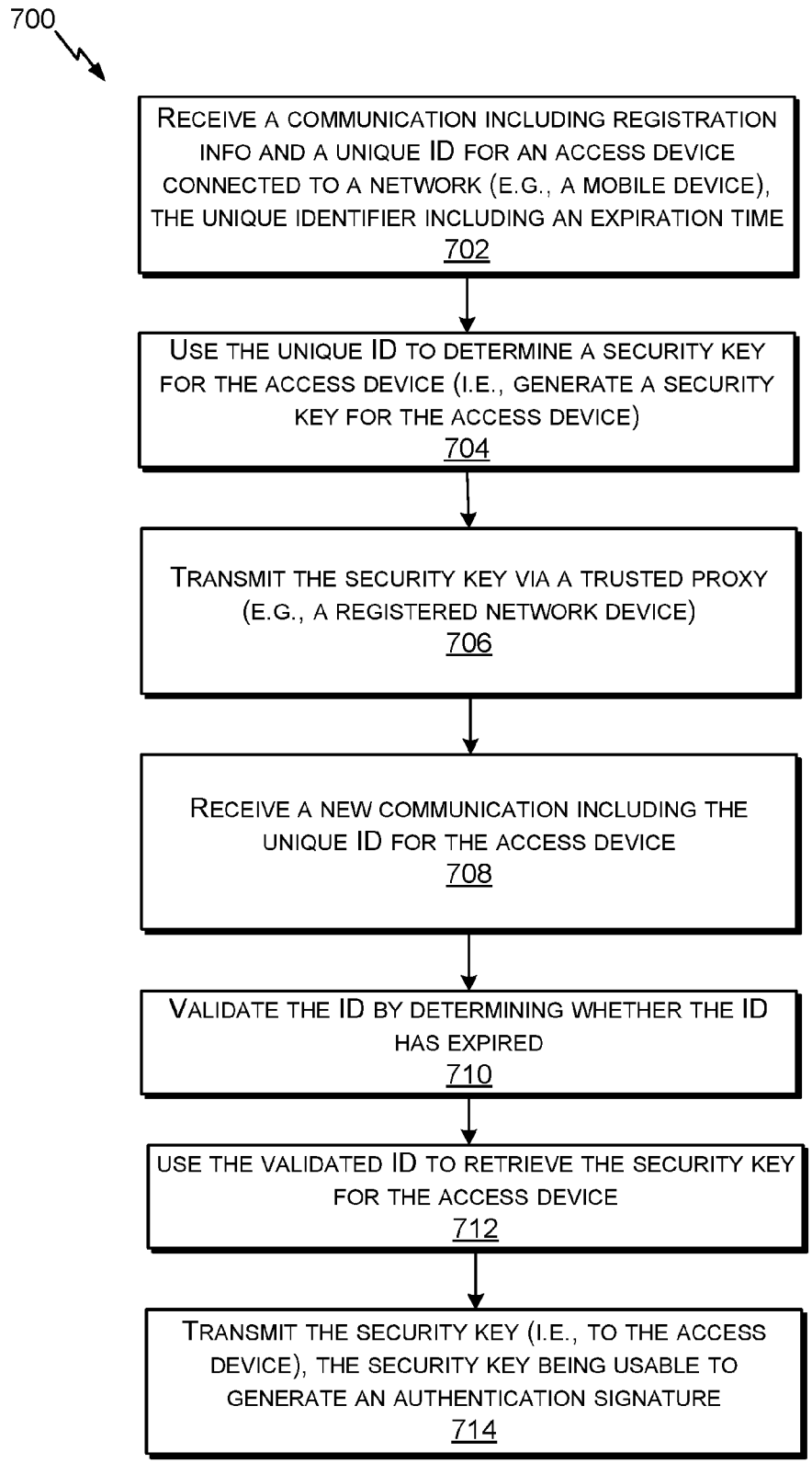
FIG. 7 is a flowchart illustrating a process for providing a security key for an access device, in accordance with some embodiments.
Figure 8:
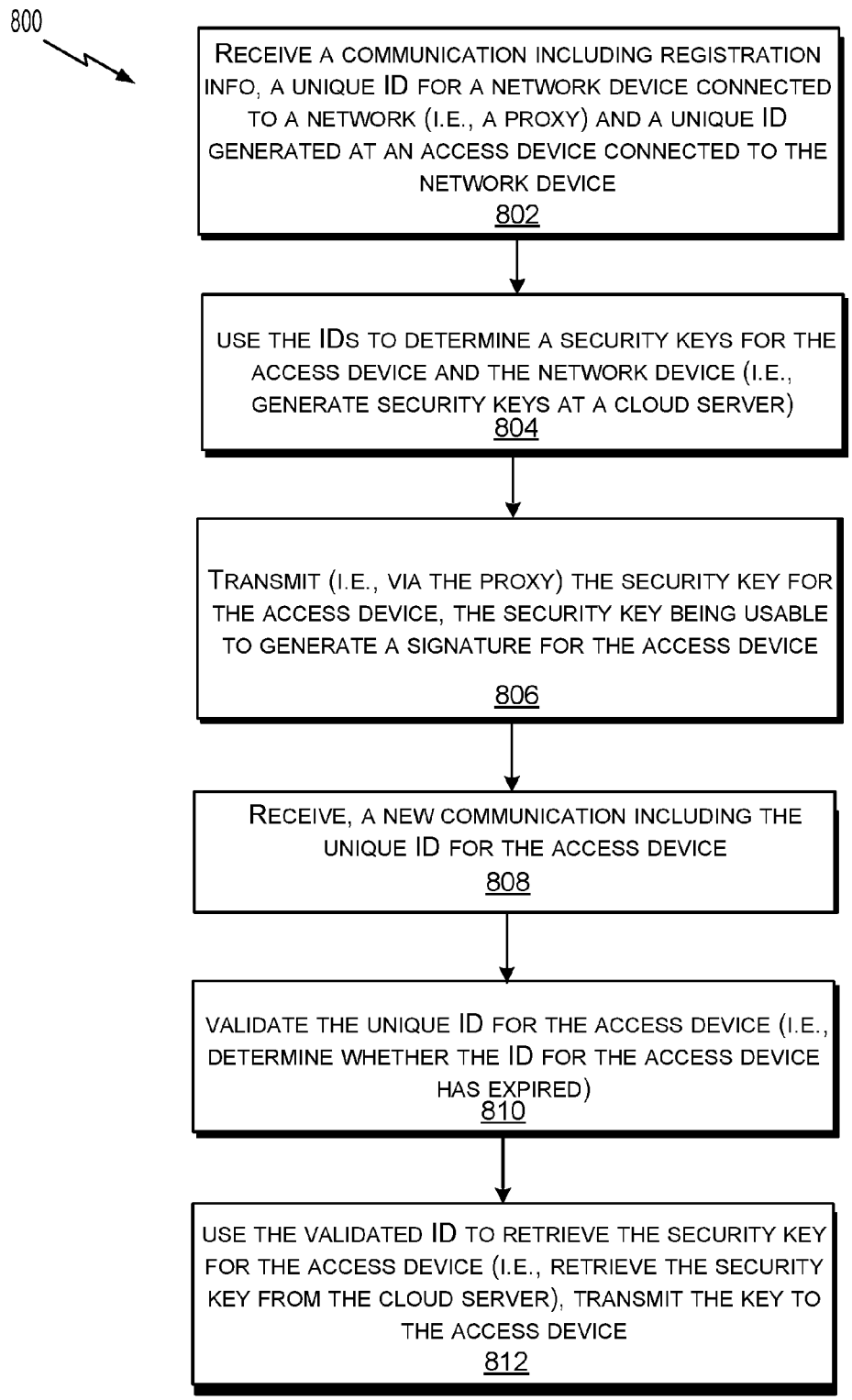
FIG. 8 is a flowchart illustrating a process for using unique identifiers to provide keys for access devices, in accordance with some embodiments.

FIGS. 7 and 8 provide techniques for providing security keys to an access device. The techniques can use a trusted proxy, such as a network device that exists within a local area network, to forward a security key to an access device. The techniques allow an access device to monitor and control network devices within the local area network regardless of whether the access device is currently connected to the local area network. For example, using the techniques described below, the server of the cloud network 114 may determine that a newly discovered network device is connected with the wireless local area network 100, and use a unique ID to register the network device and generate a security key for the network device. Upon determining that a security for the network device already exists, the server may provide the security key to the network device associated with the wireless local area network 100 in order to facilitate subsequent authentication of the network device and the access device.

Processes 700 and 800 are illustrated as a logical flow diagrams, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 700 and 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory. The processes 700 and 800 can utilize intra-network communications to inform an access device of the existence of a network device and to provide a security key for the access device to the access device. In some aspects, the processes 700 and 800 may be performed by one or more computing devices, such as the server of the cloud network 114, the access device 108, the gateway 110, and the network devices 102, 302, 304, 306, 308, 502, 504 discussed above with respect to FIGS. 1 and 3-6.

FIG. 7 shows a flow chart showing an exemplary set of steps for a process 700 of exchanging a security key between a cloud server and an access device. The key can be sent via a registered network device (e.g., a trusted proxy). The security key is usable for generating a signature, which can subsequently be used to authenticate the access device. At 702, the process 700 includes receiving a communication including registration information and a unique identifier (ID) for an access device connected to a network. As shown in FIG. 7, the access device can be a mobile device, and the unique ID can include an expiration time. The unique ID can be an application-generated ID where the application sets the expiration time as part of a setup process for the access device. In an embodiment, the communication received in 702 can also include a unique device ID for a network device. For instance, step 702 can be performed using communications 606 and 610 described above with reference to FIG. 6.

Next, at 704, the access device's unique ID is used to determine a security key for the access device. As shown, 704 can be performed by generating a security key for the access device. In an embodiment, 704 can be performed by a cloud server. For example, 704 can be performed by cloud network 114 in response to receiving communication 610 described above with reference to FIG. 6.

At 706, the security key determined in step 704 is transmitted. As shown, 706 can include transmitting the key via a trusted proxy, such as, for example, a registered network device. Next, at 708, a new communication is received that includes the unique ID for the access device. According to an embodiment, the new communication is sent from an access device after the application on the access device that generated the unique ID determines that the ID has not expired. In an embodiment, the new communication received in step 708 is communication 614 described above with reference to FIG. 6.

Then, at 710, the ID received in step 708 is validated. As shown, step 710 can be performed by determining whether the ID has expired. In an embodiment, the validation can also include determining whether the ID is in a data store of known IDs, such as data store 604 described above with reference to FIG. 6.

Next, at 712, the validated ID is used to retrieve the security key for the access device. Step 712 can be performed by identifying a security key in a local cache or data store. For example, in 712, the unique ID can be used to identify a security key for the network device within data store 604.

At 714, the process 700 includes transmitting the security key, the security key being usable to generate an authentication signature. In an embodiment, the security key is transmitted to the access device. In one embodiment, 714 can be performed using communications 612 and 608 via network device 102 (e.g., the proxy) as described above with reference to FIG. 6. In another embodiment, if the access device is not connected to the local area network, 714 can be performed using communication 616 described above with reference to FIG. 6.

FIG. 8 illustrates an embodiment of a process 800 for providing security keys for an access device and a network device connected to a network. The security keys are usable to generate signatures for authenticating the access device and the network device to a local area network. In some aspects, the process 800 may be performed by computing devices, such as access device 108, the network device 102, the gateway 110, and a server of the cloud network 114 discussed above with respect to FIGS. 1 and 3-6.

The process 800 utilizes intra-network and inter-network communications to inform a cloud network server of the existence of an access device and a network device, and to provide a security keys for the access device and the network device. At 802, the process 800 includes receiving a communication including registration information for the devices, the registration information including a unique ID for a network device connected to a local area network and a unique ID for an access device. The registration information can be for a network device that has been detected in the local area network. As shown in FIG. 8, 802 can include receiving a communication including a unique ID generated at an access device connected to the network device. The ID for the access device can be generated by an application on the access device. In an embodiment, the application generates the ID so that it includes an expiration date, but does not include any identifiable information from the access device, such as, for example, a serial number, a MAC address, and the like. In an embodiment, 802 can include receiving communication 610 described above with reference to FIG. 6.

At 804, the IDs received at 802 are used to determine a security key for the access device and a security key for the network device. In the example of FIG. 8, 804 can include generating security keys at a cloud server.

Next, at 806, the security keys determined at 804 are transmitted. In an embodiment, step 806 can include transmitting the security key for the access device via the network device using communications 612 and 608 described above with reference to FIG. 6. In this embodiment, the network device acts as a proxy for delivering the access device's security key. According to an embodiment, step 806 also includes transmitting the security key for the network device from the cloud sever to the network device using communication 612. As shown in the example of FIG. 8, the security keys can facilitate generating respective signatures for the access device and the network device.

At 808, a new communication is received that includes the application-generated, unique ID for the access device. According to an embodiment, the new communication is sent from an access device when the application that generated the unique ID determines that the ID has not expired. In one embodiment, the new communication can be communication 614 from the access device as described above with reference to FIG. 6. For example if the access device is no longer connected to the local area network (and by extension the network device), step 808 can include receiving an inter-network communication at the cloud server from the access device, where the communication includes the ID generated by the application on the access device and request for the access device's security key. As discussed above with reference to step 802, the access device's generated ID can include an expiration time.

Next, at 810, the access device's ID from the new communication is validated. In the example of FIG. 8, 810 can be performed by determining whether the ID for the access device has expired.

At 812, the validated ID is used to retrieve the security key for the access device, and the key is transmitted. As shown, 812 can be performed by retrieving the security key from the cloud server, and then transmitting the retrieved key to the access device. In an embodiment, if the access device is no longer connected to the local area network, step 812 can include transmitting the security key for the access device from the cloud server to the access device using communication 616 described above with reference to FIG. 6.

Once any of the above techniques are used to provide a security key corresponding to an access device, an authentication signature can be generated by an application executing on the access device in order to allow the access device to be authenticated. Once authenticated, the access device can be used to monitor and control the network device.

Yet another technique for providing a security key for an access device may include temporarily storing a security key in a memory or cache of a network device. For example, in environments where cloud connectivity is unavailable or is not reliable, an access device's security key stored on a network device can be transmitted from the network device to an access device. For example, this technique may include using communications 612 and 608 described above with reference to FIG. 6 to transmit a security key from cloud network 114 to network device 102, and then from network device 102 to access device 108.

Once any of the above techniques are used to identify a security key, the server may maintain a cloud-based data store (e.g., data store 604 described above with reference to FIG. 6) of stored security keys in order to enable access devices such as mobile devices to control network devices by using the security keys to generate signatures, where the signatures facilitate accountlessly authenticating to a network.

Figure 9:
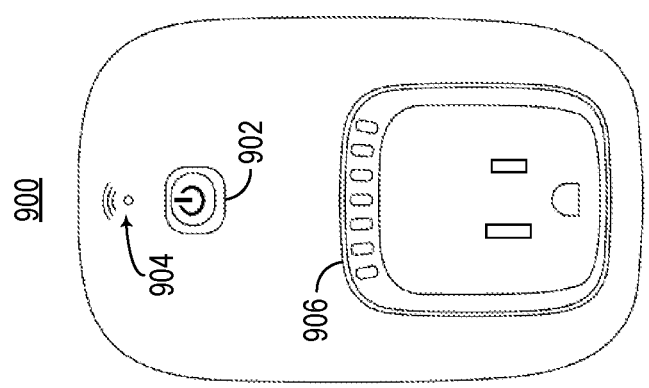
FIG. 9 is an illustration of an example of a front view of a network device, in accordance with an embodiment.
Figure 10:
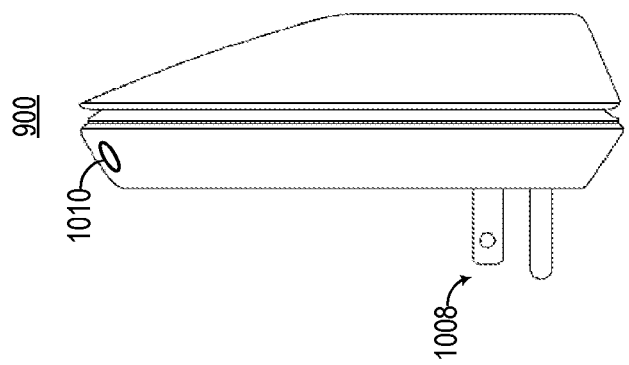
FIG. 10 is an illustration of an example of a side view of a network device, in accordance with an embodiment.

FIG. 9 illustrates an example of a front view of a network device 900. FIG. 10 illustrates an example of a side view of the network device 900. The network device 900 may include any of the network devices 102, 104, or 106 described herein. In some embodiments, the network device 900 may be a home automation network device. For example, the network device 900 may include a home automation switch that may be coupled with a home appliance. A user may wirelessly access the network device 900 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 900 may include a WiFi™ enabled switch that connects home appliances and other electronic devices to a compatible 802.11b/g/n/ac WiFi™ network. The network device 900 may thus allow users to locally or remotely turn devices on or off from anywhere, program customized notifications, and/or change device status. The network device 900 may further allow a user to create custom schedules or have devices respond to sunrise or sunset.

The network device 900 includes a power button 902 that may be depressed in order to turn the network device 900 on and off. In some embodiments, a light source may be integrated with or located behind the power button or a power switch. For example, a light-emitting diode (LED) may be located on a circuit board under the power button 902. The light source may be illuminated when the network device 900 is powered on, and may not be illuminated when the network device 900 is powered off.

The network device 900 further includes a communications signal indicator 904. The signal indicator 904 may indicate whether the network device 900 has access to a communications signal, such as a WiFi™ signal. For example, the signal indicator 904 may include a light source (e.g., a LED) that illuminates when the network device 900 is connected to a communications signal. The light source may depict different colors or other characteristics (e.g., flashing, dimming, or the like) to indicate different levels of signal strength or mode of operation.

The network device 900 includes a restore button 1010. The restore button 1010 may allow a user to reset the network device 900 to factory default settings. For example, upon being depressed, the restore button 1010 may cause all software on the device to be reset to the settings that the network device 900 included when purchased from the manufacturer.

The network device 900 further includes a plug 1008 and an outlet 906. The plug 1008 allows the network device 900 to be plugged into a wall socket, such as a socket providing 120V, 220V, or the like. In turn, an appliance may be plugged into the outlet 906. Once the network device 900 is registered according to the techniques described above, an appliance plugged into the socket 906 may be controlled by a user using an access device (e.g., access device 108).

Figure 11:
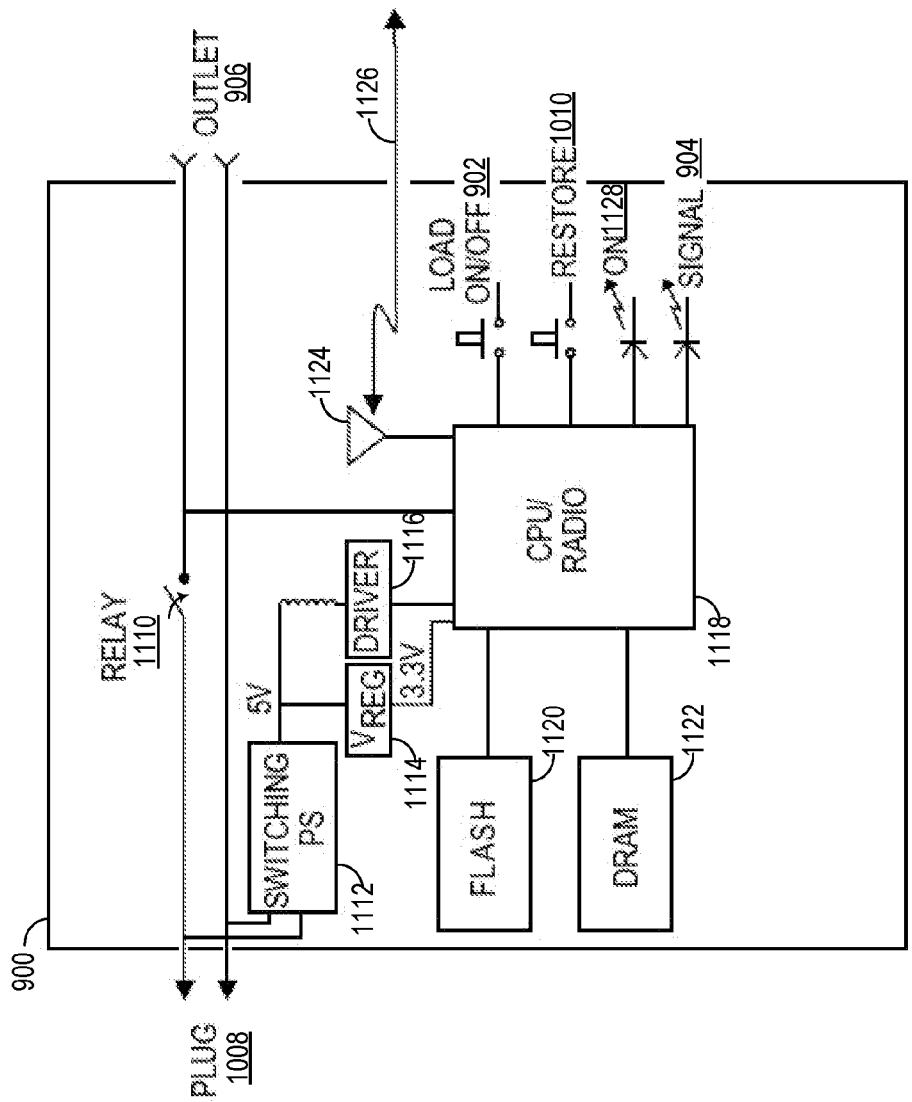
FIG. 11 is an example of a block diagram of a network device, in accordance with an embodiment.

FIG. 11 is an example of a block diagram of the network device 900 depicting different hardware and/or software components of the network device 900. As described above with respect to FIGS. 9 and 10, the network device 900 includes the outlet 906, the plug 1008, the power button 902, the restore button 1010, and the communications signal indicator 904. The network device 900 also includes light source 1128 associated with the power button 902. As previously described, the light source 1128 may be illuminated when the network device 900 is powered on.

The network device 900 further includes a relay 1110. The relay 1110 is a switch that controls whether power is relayed from the plug 1008 to the outlet 906. The relay 1110 may be controlled either manually using the power button 902 or remotely using wireless communication signals. For example, when the power button 902 is in an ON position, the relay 1110 may be closed so that power is relayed from the plug 1008 to the outlet 906. When the power button 902 is in an OFF position, the relay 1110 may be opened so that current is unable to flow from the plug 1008 to the outlet 906. As another example, an application or program running on an access device may transmit a signal that causes the relay 1110 to be opened or closed. For instance, an access application may display a graphical interface on the access device that includes a power button. The user may tap or otherwise select the power button, and the access application may send a communication signal (e.g., over a WiFi™ network) to the network device 900 instructing the network device 900 to open or close the relay 1110.

The network device 900 further includes flash memory 1120 and dynamic random access memory (DRAM) 1122. The flash memory 1120 may be used to store instructions or code relating to an operating system, one or more applications, and any firmware. The flash memory 1120 may include nonvolatile memory so that any firmware or other program can be can updated. In the event the network device 900 loses power, information stored in the flash memory 1120 may be retained. The DRAM 1122 may store various other types of information needed to run the network device 900, such as all runtime instructions or code.

The network device 900 further includes a CPU/Radio 1118. The CPU/Radio 1118 controls the operations of the network device 900. For example, the CPU/Radio 1118 may execute various applications or programs stored in the flash memory 1120 and/or the dynamic random access memory (DRAM) 1122. The CPU/Radio 1118 may also receive input from the various hardware and software components, interpret the input, and perform one or more functions in response to the input. As one example, the CPU/Radio 1118 may determine whether the power button 902 has been pressed, and determines whether the relay 1110 needs to be opened or closed. The CPU/Radio 1118 may further perform all communications functions in order to allow the network device 900 to communicate with other network devices, one or more gateways, a cloud network, and/or one or more access devices. While the CPU and radio of the network device 900 are shown to be combined in the CPU/Radio 1118, one of ordinary skill in the art will appreciate that, in some embodiments, the CPU and radio may be separately located within the network device 900. For example, CPU circuitry may be situated at a separate location on a circuit board from the location of radio circuitry, the CPU circuitry may be located on a different circuit board from the radio circuitry, or the like. Further, the network device 900 may include multiple radios that are configured to communicate using one or more communication protocols, such as any combination of a WiFi™ transceiver radio, a Bluetooth™ transceiver radio, a ZigBee® transceiver radio, a UWB transceiver radio, a WiFi-Direct transceiver radio, a BLE transceiver radio, and/or any other wireless network transceiver radio or interface. In some embodiments, the network device 900 does not include a cellular network transceiver radio or interface, and thus may not be configured to directly communicate with a cellular network. In some embodiments, the network device 900 may include a cellular network transceiver radio, and may be configured to communicate with a cellular network using the cellular network transceiver radio.

The network device 900 may communicate with other devices and/or networks via antenna 1124. For example, antenna 1124 may include a 2.4 GHz antenna, a 5 GHz antenna, or the like, that can transmit and receive WiFi™ communications signals. The network device 900 may include other types of antennas that can communicate Bluetooth® signals, ZigBee® signals, Ultra-Wideband (UWB) signals, WiFi-Direct signals, BLE signals, and/or the like. In some embodiments, the antenna 1124 may be configured to communicate different types of signals 1126, such as the WiFi™ signals, Bluetooth® signals, ZigBee® signals, UWB signals, WiFi-Direct signals, BLE signals, and/or the like. In some embodiments, the network device 900 may include multiple antennas for communicating the different types of communication signals. As one example, the network device 900 may include both a 2.4 GHz antenna and a 5 GHz antenna.

The network device 900 further includes a driver 1116, a switching power supply 1112, and a voltage regulator 1114. The driver 1116 may include instructions or code that can be used to translate control signals or commands received from applications running on the DRAM 1122 to commands that the various hardware components in the network device 900 can understand. In some embodiments, the driver 1116 may include an ambient application running on the DRAM 1122. The switching power supply 1112 may be used to transfer power from the outlet in which the plug 1008 is connected to the various loads of the network device 900 (e.g., CPU/Radio 1118). The switching power supply 1112 may efficiently convert the voltage and current characteristics of the electrical power to a level that is appropriate for the components of the network device 900. For example, the switching power supply 1112 may perform AC-DC conversion. In some embodiments, the switching power supply 1112 may be used to control the power that is relayed from the plug 1008 to the outlet 906. The voltage regulator 1114 may be used to convert the voltage output from the switching power supply 1112 to a lower voltage usable by the CPU/Radio 1118. For example, the voltage regulator 1114 may regulate the DC voltage from 5V to 3.3V.

In various embodiments, functions may be stored as one or more computer-program products, such as instructions or code, in a non-transitory machine-readable storage medium, such as the flash memory 1120 and/or the DRAM 1122. The network device 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2, and 6-8. The memory, such as the flash memory 1120 and/or the DRAM 1122, may be a processor-readable memory and/or a computer-readable memory that stores software code (programming code, instructions, etc.) configured to cause a processor(s) within the CPU/Radio 1118 to perform the functions described. In other embodiments, one or more of the functions described may be performed in hardware.

A set of these instructions and/or code might be stored on a non-transitory machine-readable storage medium, such as the flash memory 1120 and/or the DRAM 1122. In some cases, the storage medium might be incorporated within a computer system, such as the CPU/Radio 1118. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 900 and/or might take the form of source and/or installable code, which, upon compilation and/or installation on the network device 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 900 may have other components than those depicted in FIGS. 9-11. Further, the embodiment shown in the figures are only one example of a network device that may incorporate an embodiment of the invention. In some other embodiments, network device 900 may have more or fewer components than shown in the figure, may combine two or more components, or may have a different configuration or arrangement of components.

Figure 12:
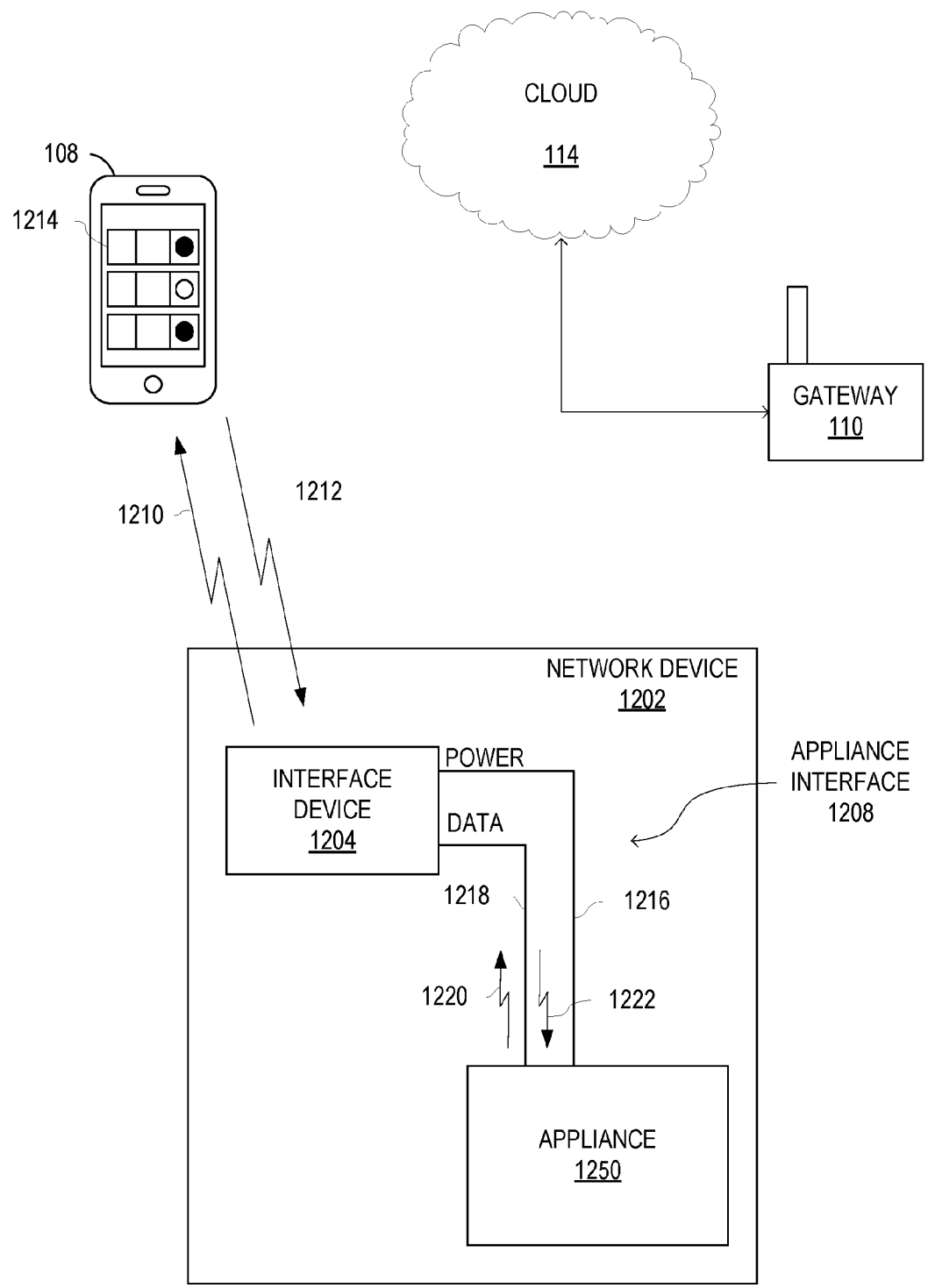
FIG. 12 is a schematic illustration of a local area network including a network device that includes an appliance, in accordance with an embodiment.

FIG. 12 is a schematic illustration of a local area network 1200 including a network device 1202 that includes an appliance 1250. The network device 1202 can comprise an interface device 1204 and the appliance 1250 connected by an appliance interface 1208. The appliance interface 1208 can include a data connection 1218 and a power connection 1216. The data connection 1218 can be a serial connection (e.g., RS-232, USB, or other), or any other suitable data connection. The interface device 1204 can be fully powered by the appliance 1202 through the power connection 1216, or can have a separate source of power.

The appliance 1250 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 1250 can be adapted to operate with the interface device 1204. The appliance 1250 can be any finite state machine. The appliance 1250 can, but need not, know or store one or more states related to the appliance. For example, the appliance 1250 may know or store data related to whether the appliance 1250 is turned on, how long the appliance has been on (or off), among other status data.

The interface device 1204 can be positioned within the housing of the appliance 1250, or can be attached externally to the appliance 1250. The interface device 1204 can be removable from the appliance 1250, or can be permanently installed in or on the appliance 1250.

The interface device 1204 can be connected to the local area network 1200 through a network interface. The interface device 1204 can be connected by a wired or wireless connection (e.g., WiFi, ZigBee®, or others described herein or well known). In some embodiments, the interface device 1204 can be connected directly to the cloud network 114 through a cellular internet connection (e.g., EDGE, LTE, or others).

The interface device 1204 can communicate with another network device, an access device 108, or another client device through the network interface 1206. The interface device 1204 can transmit a status information signal 1210 with status information to the access device 108, and the access device 108 can transmit a network device control signal 1212 to the interface device 1204. The status information signal 1210 and the network device control signal 1212 can be transmitted between the interface device 1204 and the access device 108 using a telecommunications network (e.g., a cellular network, or other suitable broadband network), using a local area network 1200 (e.g., through a gateway 110), or using the cloud network 114, although such a signal may pass through an intermediary device or network to do so.

The interface device 1204 can interpret the network device control signal 1212 and perform actions based on the contents of the network device control signal 1212. The network device control signal 1212 can include commands that can be performed by the interface device 1204 itself. The network device control signal 1212 can also include commands that are to be performed by the appliance 1250. Commands that are to be performed by the appliance 1250 can include commands like turn on or off, set a desired temperature (e.g., heat up or cool down to 215° F. or any other temperature), or other suitable commands depending on the particular appliance. The interface device 1204 can interpret the network device control signal 1212 and can send out a command 1222, through the data connection 1218 of the appliance interface 1208, based on the network device control signal 1212. The appliance 1250 can then perform the command indicated in the network device control signal 1212.

The interface device 1204 can also transmit commands to the appliance 1250 that are not based on a network device control signal received from the access device 108, but are rather based on programming in the interface device 1204. Examples of such commands can include commands to update a communication rate, commands to check a state of the appliance 1250, commands to set or get a clock time of the appliance 1250, or any other suitable commands.

The interface device 1204 can receive, through the data connection 1218 of the appliance interface 1208, a response (e.g., response 1220) to any command from the appliance 1250. In some examples, the response 1220 can include an indication that the command 1222 was received. In some examples, the response may include only an indication that a command is received (e.g., an ACK). In some examples, the response 1220 can include information for some value on the appliance 1250, such as an "on/off" state, a serial number, a product identification, a manufacturer identification, a temperature, a time since live, a setting, or any other value retrievable from the appliance 1250. The interface device 1204 can interpret the value and can send information about the value (e.g., the state of the appliance is "on," the temperature of the appliance, the time since the appliance first turned on, or other information) as status information (e.g. using status information signal 1210) to the access device 108. Additionally, the interface device 1204 can send status information about itself (e.g., time since live, supplied power, signal strength, and others) as status information (e.g. using status information signal 1210) to the access device 108.

The interface device 1204 can also use responses (e.g., response 1220) from the appliance 1250 to perform additional functions at the interface device 1204, such as error handling. In some cases, when performing the additional functions, the interface device 1204 does not transmit any status information 1210 to the access device 108 based on those particular responses.

The access device 108 can include one or more modular tiles (e.g., tile 1214) for displaying information and controls corresponding to network devices such as network device 1202.

In some embodiments, the interface device 1204 can transmit a heartbeat command (e.g., command 1222) over the data connection 1218 to the appliance 1202 to determine whether the appliance 1250 is working properly and/or in a state of readiness. If the interface device 1204 determines that the appliance 1250 has had some sort of failure (e.g., the appliance 1250 sends a response 1220 indicating a failure or the interface device 1204 does not receive any response 1220), the interface device 1204 can take corrective action (e.g., restarting the appliance 1250 or an element of the appliance 1250), can log the event, or can alert the user).

Figure 13:
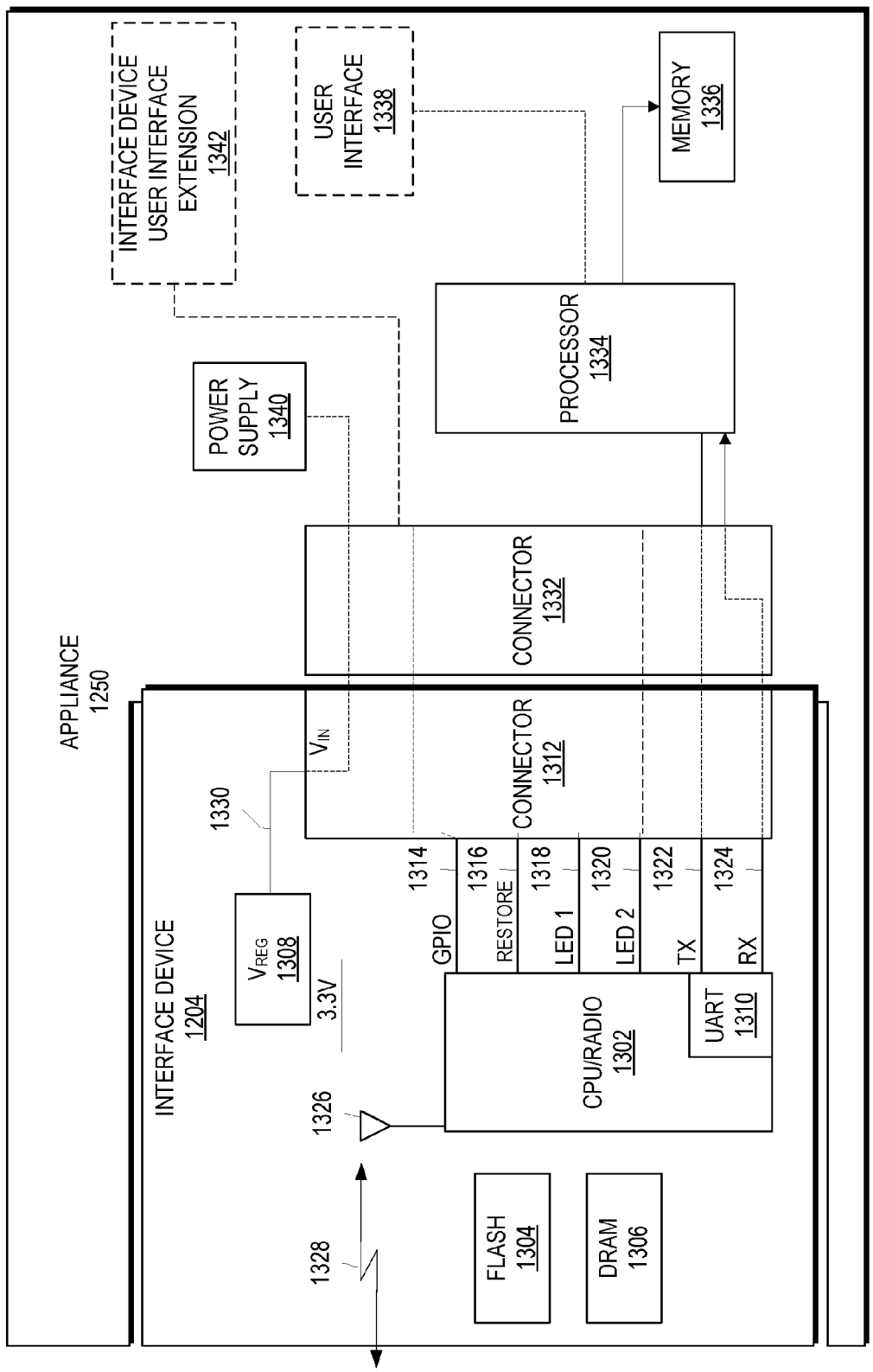
FIG. 13 is an example of a block diagram of a network device including an interface device attached to an appliance, in accordance with an embodiment.

FIG. 13 depicts a block diagram of a network device including an interface device 1204 attached to an appliance 1250, according to one embodiment. The interface device 1204 can include connector 1312 that interacts with connector 1332 of the appliance 1250.

The interface device 1204 can include flash memory 1304 and dynamic random access memory (DRAM) 1306. The flash memory 1304 may be used to store instructions or code relating to an operating system, one or more applications, and any firmware. The flash memory 1304 can be used to store a cache. The flash memory 1304 may include non-volatile memory so that any firmware or other program can be can updated. In the event the interface device 1204 loses power, information stored in the flash memory 1304 may be retained. The DRAM 1306 may store various other types of information needed to run the interface device 1204, such as all runtime instructions or code. The flash memory 1304 or DRAM 1306 or a combination thereof may include all instructions necessary to communicate with an appliance 1250, including all instructions necessary to communicate using the appliance serial protocol disclosed herein.

The interface device 1204 further includes a CPU/Radio 1302. The CPU/Radio 1302 can control the operations of the interface device 1204. For example, the CPU/Radio 1302 may execute various applications or programs stored in the flash memory 1304 and/or the dynamic random access memory (DRAM) 1306. The CPU/Radio 1302 may also receive input from the appliance 1250, interpret the input, and perform one or more functions in response to the input. The CPU/Radio 1302 may further perform all communications functions in order to allow the interface device 1204 to communicate with other network devices, one or more gateways, a cloud network, and/or one or more access devices. The interface device 1204 may communicate with other devices and/or networks via antenna 1326. For example, antenna 1326 may include a 2.4 GHz antenna that can transmit and receive WiFi communications signals 1328. The antenna 1326 may include other types of antennas that can communicate Bluetooth® signals, ZigBee® signals, Ultra-Wideband (UWB) signals, and/or the like. In some embodiments, the interface device 1204 may include multiple antennas for communicating different types of communication signals.

The CPU/Radio 1302 can include at least one universal asynchronous receiver/transmitter (UART) 1310. The CPU/Radio 1203 can use the UART 1310 to send and receive serial communications. The CPU/Radio 1203 can send data through a transmit line 1322 and a receive data through a receive line 1324. The CPU/Radio 1203 can send and receive data through the transmit line 1322 and receive line 1324 using a serial protocol, such as RS232. The CPU/Radio 1302 can also include an input/output (GPIO) line 1314, a restore line 1316, an LED 1 line 1318, and an LED 2 line 1320. The CPU/Radio 1302 can have additional or fewer lines as necessary. The GPIO line 1314 can be used for any suitable function, such as powering an indicator light on an appliance 1250 or accepting an input from the appliance 1250. A signal sent on the restore line 1316 can be used to restore the CPU/Radio 1302 and/or the interface device 1204 to factory defaults. The LED 1 line 1318 and LED 2 line 1320 can be used to power first and second LEDs that can be used to indicate various statuses, such as whether the interface device has a network connection and whether the interface device is powered on.

The interface device 1204 further includes a voltage regulator 1308. The voltage regulator 1308 may be used to convert the voltage output from the appliance 1250 to a voltage usable by the CPU/Radio 1302. For example, the voltage regulator 1308 may regulate the DC voltage from 5V to 3.3V. The voltage regulator 1308 can be supplied with power from a power line 1330.

Each of the interface lines, including the GPIO line 1314, the restore line 1316, the LED 1 line 1318, the LED 2 line 1320, the transmit line 1322, the receive line 1324, the power line 1330, and any additional lines, can be routed through connector 1312. Connector 1312 can be a proprietary or universal connector. Any appliance 1250 to which the interface device 1204 is attached through the connector 1312 can have the necessary hardware to make use of the interface lines, such as to provide power to the power line 1330 and to provide the first and second LEDs that are driven by the LED 1 line 1318 and LED 2 line 1320.

In alternate embodiments, some interface lines are not routed through the connector 1312. For example, the power line 1330 can be routed to a power supply attached directly to the interface device 1204, and the LED 1 line 1318 and LED 2 line 1320 can be routed to first and second LEDs located within the interface device 1204.

In various embodiments, functions may be stored as one or more instructions or code in memory, such as the flash memory 1304 and/or the DRAM 1306. The interface device 1204 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1304 and/or the DRAM 1306, may be a processor-readable memory and/or a computer-readable memory that stores software code (programming code, instructions, etc.) configured to cause a processor(s) within the CPU/Radio 1302 to perform the functions described. In other embodiments, one or more of the functions described may be performed in hardware.

A set of these instructions and/or code might be stored on a computer-readable storage medium, such as the flash memory 1304 and/or the DRAM 1306. In some cases, the storage medium might be incorporated within a computer system, such as the CPU/Radio 1302. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 1204 and/or might take the form of source and/or installable code, which, upon compilation and/or installation on the interface device 1204 (e.g., using any of a variety of compilers, installation programs, compression/decompression utilities, etc.) then takes the form of executable code.

The interface device 1204 may have other components than those depicted in FIG. 13. Further, the embodiment shown in the figures are only one example of an interface device that may incorporate an embodiment of the invention. In some other embodiments, interface device 1204 may have more or fewer components than shown in the figure, may combine two or more components, or may have a different configuration or arrangement of components.

The appliance 1250 can have a processor 1334. The processor 1334 can be a microcontroller, such as a Peripheral Interface Controller (PIC). The appliance 1250 can include a memory 1336 (e.g., a flash memory or other) that is readable by the processor 1334. The memory 1336 can include instructions enabling the innate functionality of the appliance 1250, such as heating and timing for a crock pot.

The appliance 1250 can include a user interface 1338. The user interface 1338 can provide buttons, displays, LEDs, knobs, and other input and output elements necessary for a user to interact with the appliance 1250. For example, a user interface 1338 for a slow cooker can include a display, a power button, a temperature adjustment button, and a start button. The user interface 1338 can be driven and/or monitored by the processor 1334. In some embodiments, the appliance 1250 is "headless" or has no user interface 1338.

The appliance 1250 can include a power supply 1340 that can provide power to the voltage regulator 1338 of the interface device 1204 through connector 1332, connector 1312, and power line 1330.

The appliance 1250 can include an interface device user interface extension 1342. The interface device user interface extension 1342 can include various input and output elements that are passed directly to the interface device 1204 without being processed by the processor 1334. Examples of input and output elements of the interface device user interface extension 1342 include LEDs associated with the LED 1 line 1318 and LED 2 line 1320, a hardware restore button associated with the restore line 1316, or any other suitable input/output element.

Figure 14:
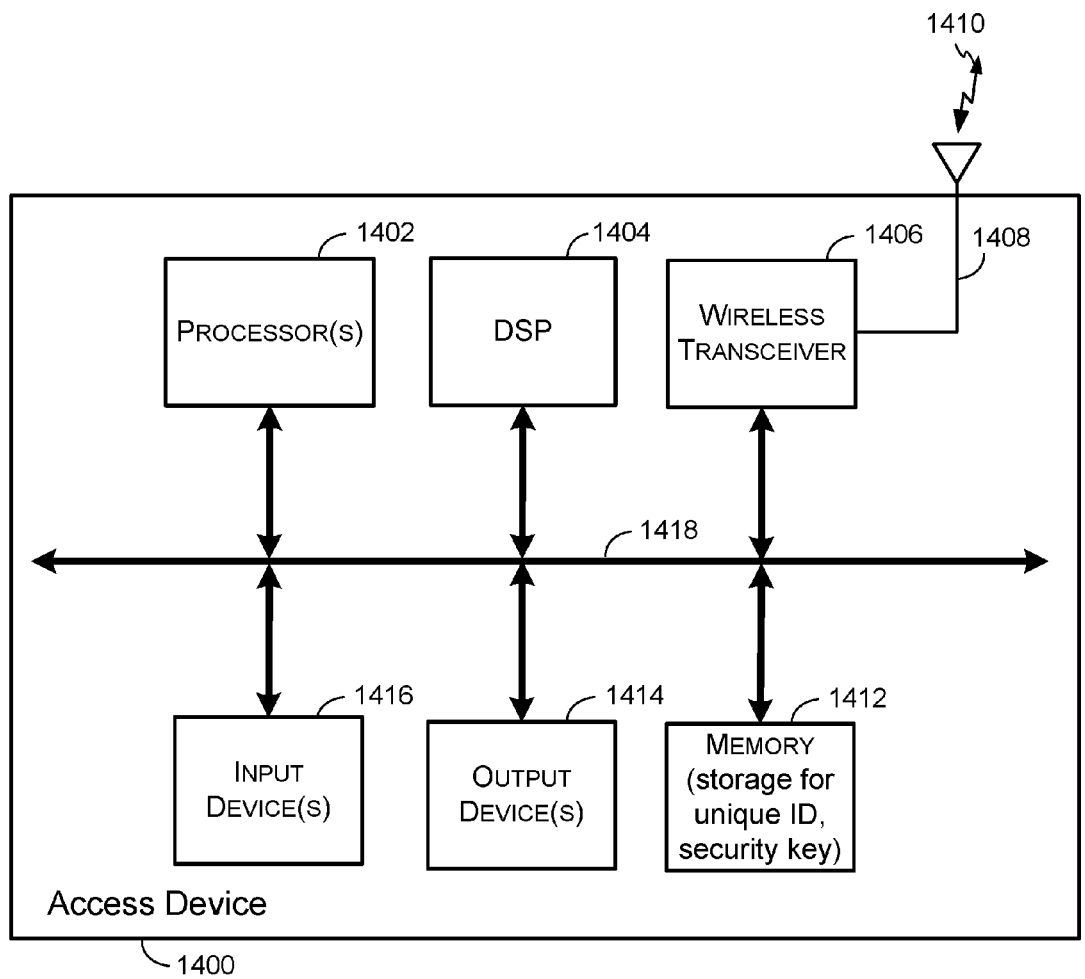
FIG. 14 is a block diagram illustrating an example of an access device, in accordance with some embodiments.

FIG. 14 illustrates an example of an access device 1400. The access device 1400 may include any human-to-machine interface with network connection capability that allows access to a network. For example, the access device 1400 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1400 includes hardware elements that can be electrically coupled via a bus 1418 (or may otherwise be in communication, as appropriate). In one embodiment, the bus 1418 can be used for the processor(s) 1402 to communicate between cores and/or with the memory 1412. As shown in the example of FIG. 14, the memory 1412 can be used to as a cache to store a unique identifier (e.g., unique ID) and/or a security key for access device 1400. As discussed above with reference to FIG. 6, a security key can be sent to access device 1400 from cloud network 114. For example, when the cloud network 114 finds a security key for access device 1400 in its data store 604, it may transmit the security key to the access device 1400. After the security key is downloaded to access device 1400 from cloud network 114, the security key can be stored in memory 1412 and subsequently used to generate an authentication signature for the access device 1400.

The hardware elements may include one or more processors 1402, including without limitation one or more general-purpose processors and/or one or more special-purpose processors (such as digital signal processing chips, graphics acceleration processors, and/or the like); one or more input devices 1416, which can include without limitation a camera, a mouse, a keyboard, a touch sensitive screen, a touch pad, a keypad, and/or the like; and one or more output devices 1414, which can include, without limitation, a display, a printer, and/or the like.

The access device 1400 may include one or more wireless transceivers 1406 connected to the bus 1418. The wireless transceiver 1406 may be operable to receive wireless signals (e.g., signal 1410) via antenna 1408. The wireless signal 1410 may be transmitted via a wireless network. In some embodiments, the wireless network may be any wireless network including but not limited to a wireless local area network (e.g., local area network 100), such as WiFi™, a Personal Access Network (PAN), such as Bluetooth®, ZigBee®, or UWB, or a wide area network, such as a cellular network (e.g., a GSM, WCDMA, LTE, or CDMA2000 network), a cloud network, the Internet, or other network. Wireless transceiver 1406 may be configured to receive various radio frequency (RF) signals (e.g., signal 1410) via antenna 1408 from one or more gateways, network devices, other access devices, cloud networks, and/or the like. Access device 1400 may also be configured to decode and/or decrypt, via the DSP 1404 and/or processor(s) 1402, various signals received from one or more gateways, network devices, other access devices, cloud networks, and/or the like.

The access device 1400 may further include (and/or be in communication with) one or more non-transitory machine-readable storage mediums or storage devices (e.g., memory 1412), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. As shown, the memory 1412 can be used to store a unique, application-generated ID for the access device 1400. In the example of FIG. 14, the memory 1412 can also be used to store a security key that has been downloaded to access device 1400 from a cloud network.

In various embodiments, functions may be stored as one or more computer-program products, such as instructions or code, in memory 1412, such as RAM, ROM, FLASH, or disc drive, and executed by processor(s) 1402 or DSP 1404. The access device 1400 can also comprise software elements (e.g., located within the memory 1412), including, for example, an operating system, device drivers, executable libraries, and/or other code, such as one or more application programs, which may comprise computer programs implementing various functions. Memory 1412 may be a non-transitory machine-readable storage medium, processor-readable memory, and/or a computer-readable memory that stores the one or more computer-program products configured to cause the processor(s) 1402 and/or DSP 1404 to perform the various functions. In other embodiments, the various functions described may be performed in hardware.

Figure 15:
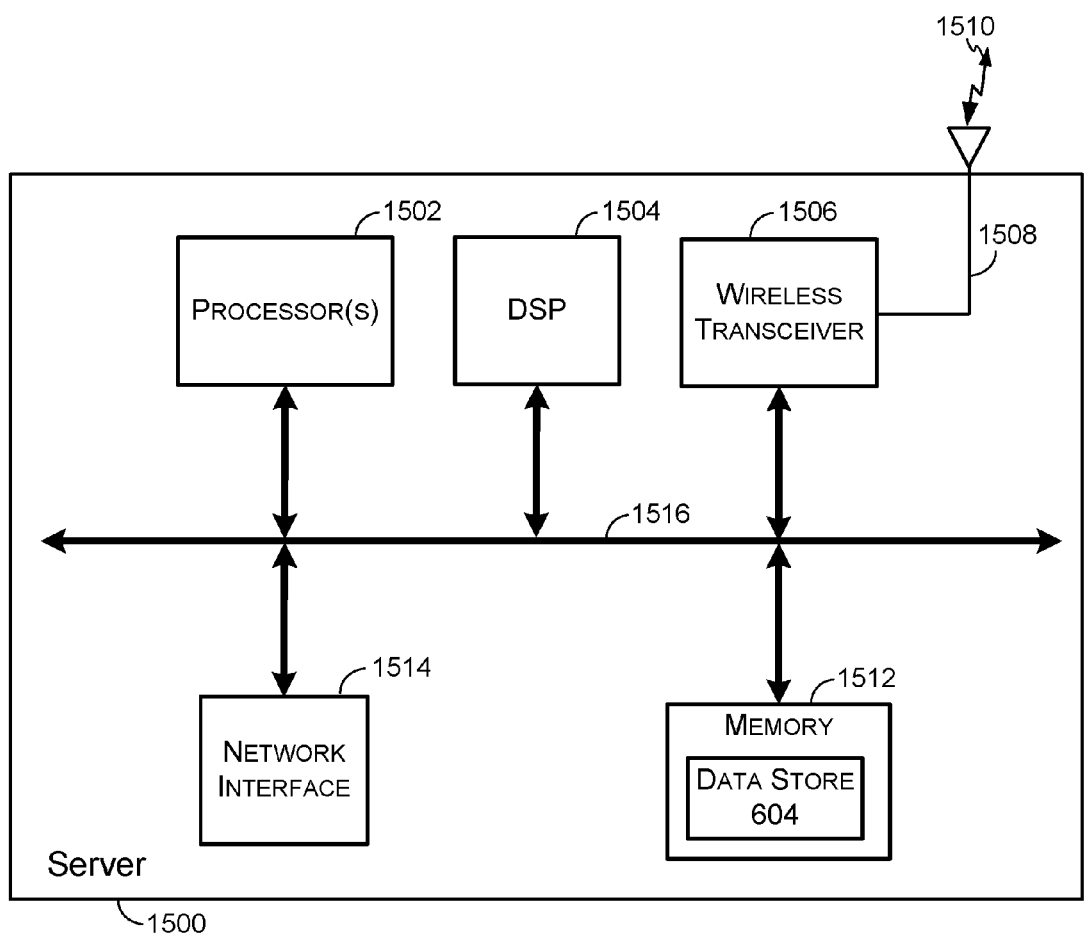
FIG. 15 is a block diagram illustrating an example of a server, in accordance with some embodiments.

FIG. 15 illustrates an example of a server 1500. The server 1500 includes hardware elements that can be electrically coupled via a bus 1516 (or may otherwise be in communication, as appropriate). In one embodiment, the bus 1516 can be used for the processor(s) 1502 to communicate between cores and/or with the memory 1512. The hardware elements may include one or more processors 1502, including without limitation, one or more general-purpose processors and/or one or more special-purpose processors (such as digital signal processing chips, graphics acceleration processors, and/or the like), memory 1512, DSP 1504, a wireless transceiver 1506, a bus 1516, and antenna 1508 operable to receive wireless signals (e.g., a wireless signal 1510). Furthermore, in addition to the wireless transceiver 1506, server 1500 can further include a network interface 1514 to communicate with a network (e.g., a local area network, a network of a preferred carrier, Internet, etc.).

The server 1500 may further include (and/or be in communication with) one or more non-transitory machine-readable storage mediums or storage devices (e.g., memory 1512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. As shown in the example of FIG. 15, the memory 1512 can be used to store data store 604. As discussed above with reference to FIG. 6, data store 604 can be a database configured to store security keys for a plurality of network devices, with each of the stored security keys being mapped to a unique ID for a network device.

In various embodiments, functions may be stored as one or more one or more computer-program products, such as instructions or code, in memory 1512. The server 1500 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2, and 6-8. The memory 1512 may be a non-transitory machine-readable storage medium, processor-readable memory, and/or a computer-readable memory that stores the one or more computer-program products configured to cause the processor(s) 1502 to perform the functions described. In other embodiments, one or more of the functions described may be performed in hardware.

A set of these instructions and/or code might be stored on a non-transitory machine-readable storage medium, such as the memory 1512. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1500 and/or might take the form of source and/or installable code, which, upon compilation and/or installation on the server 1500 (e.g., using any of a variety of generally available compilers, installation programs, compression/decompression utilities, etc.) then takes the form of executable code.

Figure 16:
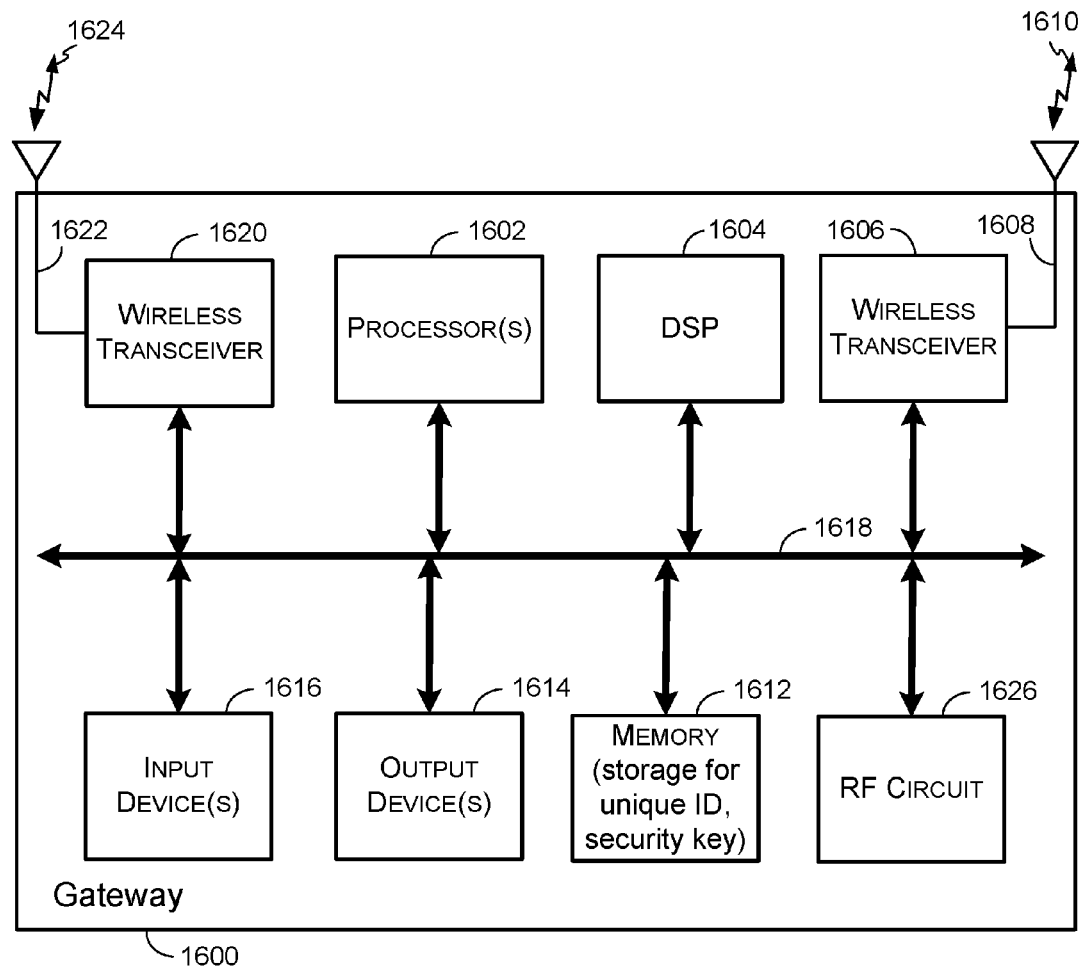
FIG. 16 is a block diagram illustrating an example of a gateway, in accordance with some embodiments.

FIG. 16 illustrates an example of a gateway 1600. The gateway 1600 may include a range extending device, a router, an access point, a modem, and/or any other device that provides network access among one or more computing devices and/or external networks. For example, the gateway 1600 may include a router gateway with access point and router functionality, and may further include an Ethernet switch and/or a modem. As another example, the gateway 1600 may include a range extending gateway that may be used to improve signal range and strength within a network by taking an existing signal from another gateway (e.g., a router gateway, an access point, or the like) and rebroadcasting the signal to create a second logical network.

The gateway 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation one or more buttons, a keyboard, a keypad, a touch sensitive screen, a touch pad, and/or the like; and one or more output devices 1614, which can include, without limitation, a display, light or sound indicators, and/or the like.

The gateway 1600 may include one or more wireless transceivers 1606 and 1620 connected to the bus 1618. The wireless transceiver 1606 may be operable to receive wireless signals (e.g., a wireless signal 1610) via an antenna 1608. The wireless transceivers 1620 may be operable to receive wireless signals (e.g., a wireless signal 1614) via an antenna 1622. The wireless transceivers 1606 and 1620 may each include a WiFi™ transceiver radio designed to transmit and receive signals using frequencies of a specific frequency band, which may be referred to herein as "WiFi™ circuits." For example, wireless transceiver 1606 may include a 2.4 GHz WiFi™ circuit, and wireless transceiver 1620 may include a 5 GHz WiFi™ circuit. Accordingly, the gateway 1600 may include a single WiFi™ circuit for a first WiFi™ frequency band, and a single WiFi™ circuit for a second WiFi™ frequency band. In some embodiments, the gateway 1600 may include multiple wireless transceivers (not shown) for each available frequency band. The antennas 1608 and 1622 may include multiple band antennas that can transmit and/or receive signals over different frequency bands.

The gateway 1600 may further include radio frequency (RF) circuit 1626. In some embodiments, the wireless transceivers 1606 and 1620 may be integrated with or coupled to the RF circuit 1626 so that the RF circuit 1626 includes the wireless transceivers 1606 and 1620. In some embodiments, the wireless transceivers 1606 and 1620 and the RF circuit 1626 are separate components. The RF circuit 1626 may include a RF amplifier that may amplify signals received over antennas 1608 and 1622. The RF circuit 1626 may also include a power controller that may be used to adjust signal amplification by the RF amplifier. The power controller may be implemented using hardware, firmware, software, or any combination thereof.

The wireless signals 1610 and 1624 may be transmitted via a wireless network. In some embodiments, the wireless network may be any wireless network including but not limited to a wireless local area network (e.g., local area network 100), such as WiFi™, a Personal Access Network (PAN), such as Bluetooth®, ZigBee®, or UWB, or a wide area network, such as a cellular network (e.g. a GSM, WCDMA, LTE, CDMA2000 network), a cloud network, the Internet, or other network. Wireless transceivers 1606 and 1620 may be configured to receive various radio frequency (RF) signals (e.g., signals 1610 and 1624) via antennas 1608 and 1624, respectively, from one or more other gateways, access devices, network devices, cloud networks, and/or the like. Gateway 1600 may also be configured to decode and/or decrypt, via the DSP 1604 and/or processor(s) 1602, various signals received from one or more gateways, network devices, cloud networks, and/or the like.

The gateway 1600 may include a power supply (not shown) that can power the various components of the gateway 1600. The power supply may include a switch-mode power supply, a linear power supply, a push-pull power supply, or any other suitable type of power supply. In some embodiments, the gateway 1600 may include multiple power supplies. For example, a switch-mode power supply may be used to condition input power, and a linear power supply may be used to power the RF circuit 1626. The power supply may be configured to operate over various ranges of appropriate input voltages.

The gateway 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. As shown in the example of FIG. 16, the memory 1612 can be used to store a unique identifier (e.g., unique ID) and/or a security key for gateway 1600. A security key can be sent to gateway 1600 from a cloud network. For example, when the cloud network finds a security key for gateway 1600 in its data store, it may transmit the security key to the gateway 1600. After the security key is downloaded to gateway 1600 from the cloud network, the security key can be stored in memory 1612 and subsequently used to generate an authentication signature for gateway 1600.

In various embodiments, functions may be stored as one or more computer-program products, such as instructions or code, in memory 1612, such as RAM, ROM, FLASH, or disc drive, and executed by processor(s) 1602 or DSP 1604. The gateway 1600 can also comprise software elements (e.g., located within the memory 1612), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2 and 6-8, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2 and 6-8. The memory 1612 may be a non-transitory machine-readable storage medium, processor-readable memory, and/or a computer-readable memory that stores the one or more computer-program products configured to cause the processor(s)

1602 to perform the functions described. In other embodiments, one or more of the functions described may be performed in hardware.

A set of these instructions and/or code might be stored on a non-transitory machine-readable storage medium, such as the memory 1612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1600 and/or might take the form of source and/or installable code, which, upon compilation and/or installation on the gateway 1600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system, comprising:
one or more data processors; and
a non-transitory computer-readable storage medium containing instructions which when executed on the one or more data processors, cause the one or more processors to perform operations including:
receiving a communication, wherein the communication corresponds to a request to register a network device as a trusted network device, wherein the communication includes a unique identifier for the network device, and wherein an operation of the network device is controllable by an access device;
identifying, at a computing device, a network associated with the network device, wherein identifying includes using the communication;
determining whether the network device is locally connected to the network, wherein the network is connected to a plurality of additional network devices including the network device;
determining that the network device is a trusted network device when the network device is locally connected to the network;
receiving a new communication, wherein the new communication corresponds to a request for the access device to control an operation of one or more network devices connected to the network;
determining whether the new communication is received from the trusted network device, wherein when the new communication is received from the trusted network device, an access device key is generated for the access device; and
transmitting the access device key, wherein transmitting includes using the trusted network device, wherein when the access device key is received at the access device, the access device key facilitates generating a signature for the access device, and wherein the signature enables the access device to control the operation of the one or more network devices without having to provide a login credential.

2. The system of claim 1, further comprising instructions which when executed on the one or more data processors, cause the one or more processors to perform operations including:
receiving the signature; and
using the signature to authenticate the access device.

3. The system of claim 1, wherein transmitting the security key includes using a trusted proxy.

4. The system of claim 1, wherein the new communication includes an expiration time generated by the access device, and wherein the expiration time is used to validate the unique identifier.

5. The system of claim 1, wherein the system is a cloud computing system, and wherein the instructions further comprise instructions which when executed on the one or more data processors, cause the one or more processors to implement a cloud based service configured to:
receive unique identifiers corresponding to the plurality of network devices and one or more access devices;
generate security keys corresponding to the plurality of network devices and the one or more access devices;
associate the security keys with the unique identifiers; and
store the security keys and the unique identifiers.

6. The system of claim 1, wherein the network is a home automation network and wherein the new communication is received while the access device is not connected to the home automation network.

7. A computer-implemented method, comprising:
receiving, at a computing device, a communication, wherein the communication corresponds to a request to register a network device as a trusted network device, wherein the communication includes a unique identifier for the network device, and wherein an operation of the network device is controllable by an access device;
identifying, at the computing device, a network associated with the network device, wherein identifying includes using the communication;
determining whether the network device is locally connected to the network, wherein the network is connected to a plurality of network devices including the network device;
determining that the network device is a trusted network device when the network device is locally connected to the network;
receiving, at the computing device, a new communication, wherein the new communication corresponds to a request for the access device to control an operation of one or more network devices connected to the network;
determining whether the new communication is received from the trusted network device, wherein when the new communication is received from the trusted network device, an access device key is generated for the access device; and
transmitting the access device key, wherein transmitting includes using the trusted network device, wherein when the access device key is received at the access device, the access device key facilitates generating a signature for the access device, and wherein the signature enables the access device to control the operation of the one or more network devices without having to provide a login credential.

8. The method of claim 7, further comprising:
receiving, at the computing device, the signature; and using the signature to authenticate the access device.

9. The method of claim 7, wherein transmitting the security key includes using a trusted proxy.

10. The method of claim 7, wherein the new communication includes an expiration time generated by the access device, and wherein the expiration time is used to validate the unique identifier.

11. The method of claim 7, wherein the computing device is a cloud server hosting a cloud based service configured to:
receive unique identifiers corresponding to the plurality of network devices and one or more access devices;
generate security keys corresponding to the plurality of network devices and the one or more access devices;
associate the security keys with the unique identifiers; and
store the security keys and the unique identifiers.

12. A computer-program product tangibly embodied in a non-transitory machine-readable storage medium, including instructions configured to cause a data processing apparatus to:
receive a communication, wherein the communication corresponds to a request to register a network device as a trusted network device, wherein the communication includes a unique identifier for the network device, and wherein an operation of the network device is controllable by an access device;
identify, at a computing device, a network associated with the network device, wherein identifying includes using the communication;
determine whether the network device is locally connected to the network, wherein the network is connected to a plurality of network devices including the network device;
determine that the network device is a trusted network device when the network device is locally connected to the network;
receive a new communication, wherein the new communication corresponds to a request for the access device to control an operation of one or more network devices connected to the network;
determine whether the new communication is received from the trusted network device, wherein when the new communication is received from the trusted network device, an access device key is generated for the access device; and
transmit the access device key, wherein transmitting includes using the trusted network device, wherein when the access device key is received at the access device, the access device key facilitates generating a signature for the access device, and wherein the signature enables the access device to control the operation of the one or more network devices without having to provide a login credential.

13. The computer-program product of claim 12, wherein when the access device key is received by the access device, the security key facilitates generating a signature for the access device.

14. The computer-program product of claim 12, further comprising instructions configured to cause the data processing apparatus to:
receive the signature; and
use the signature to authenticate the access device.

15. The computer-program product of claim 12, wherein transmitting the access device key includes using a trusted proxy, and wherein the trusted proxy is a network device.

16. The computer-program product of claim 12, wherein the new communication includes an expiration time generated by the access device, and wherein the expiration time is used to validate the unique identifier.

17. The computer-program product of claim 12, further comprising instructions configured to cause the data processing apparatus to implement a cloud based service configured to:
receive unique identifiers corresponding to the plurality of network devices and one or more access devices;
generate security keys corresponding to the plurality of network devices and the one or more access devices;
associate the security keys with the unique identifiers; and
store the security keys and the unique identifiers.

18. The computer-program product of claim 12, wherein the network is a home automation network and wherein the new communication is received while the access device is not connected to the home automation network.

* * * * *